United States Patent
Oyama

(10) Patent No.: US 8,792,942 B2
(45) Date of Patent: Jul. 29, 2014

(54) BASE STATION DEVICE, COMMUNICATION SYSTEM, AND CONTROL METHOD OF TILT ANGLE OF ANTENNA

(75) Inventor: Teppei Oyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 12/874,195

(22) Filed: Sep. 1, 2010

(65) Prior Publication Data

US 2011/0053647 A1    Mar. 3, 2011

(30) Foreign Application Priority Data

Sep. 2, 2009 (JP) ................................. 2009-202712

(51) Int. Cl.
*H04M 1/00* (2006.01)
*H04W 16/28* (2009.01)
*H04W 72/08* (2009.01)

(52) U.S. Cl.
CPC .................................. *H04W 16/28* (2013.01); *H04W 72/085* (2013.01)
USPC ..................................... 455/562.1; 455/575.7

(58) Field of Classification Search
CPC ..................................................... H04W 16/28
USPC ........................................ 455/562.1, 575.7
See application file for complete search history.

(56) References Cited

U.S. PATENT DOCUMENTS

| | | | | |
|---|---|---|---|---|
| 5,596,333 A | * | 1/1997 | Bruckert | 342/457 |
| 6,104,936 A | * | 8/2000 | Kronestedt | 455/562.1 |
| 6,282,434 B1 | * | 8/2001 | Johannisson et al. | 455/562.1 |
| 7,218,955 B2 | * | 5/2007 | Aoyama et al. | 455/562.1 |
| 8,229,418 B2 | * | 7/2012 | Mori et al. | 455/424 |
| 2005/0130662 A1 | * | 6/2005 | Murai | 455/444 |
| 2008/0107086 A1 | | 5/2008 | Fukuta | |

FOREIGN PATENT DOCUMENTS

| | | |
|---|---|---|
| JP | 2007-28091 A | 2/2007 |
| JP | 2007-514367 A | 5/2007 |
| JP | 2008-141741 A | 6/2008 |

* cited by examiner

*Primary Examiner* — Mahendra Patel
*Assistant Examiner* — Edd Rianne Plata
(74) *Attorney, Agent, or Firm* — Fujitsu Patent Center

(57) ABSTRACT

A base station device includes a first antenna which transmits a radio signal in a downlink, a second antenna which receives a radio signal in an uplink, and a tilt angle control unit which controls a tilt angle of the first antenna and the second antenna to decrease a difference in a position of a cell boundary of the downlink and a position of the cell boundary of the uplink based on a communication quality of the downlink and a communication quality of the uplink with respect to a first base station device and on the communication quality of a downlink and a communication quality of the uplink with respect to an adjacent second base station device.

14 Claims, 26 Drawing Sheets

| TERMINAL ID | DOWNLINK CONNECTION CELL | UPLINK HIGHEST COMMUNICATION QUALITY CELL |
|---|---|---|
| 0 | 7 | 7 |
| 1 | 7 | 1 |
| 2 | 7 | 1 |
| 5 | 7 | 7 |
| 7 | 7 | 5 |
| 11 | 7 | 5 |
| 14 | 7 | 7 |
| 15 | 7 | 7 |
| ⋮ | ⋮ | ⋮ |

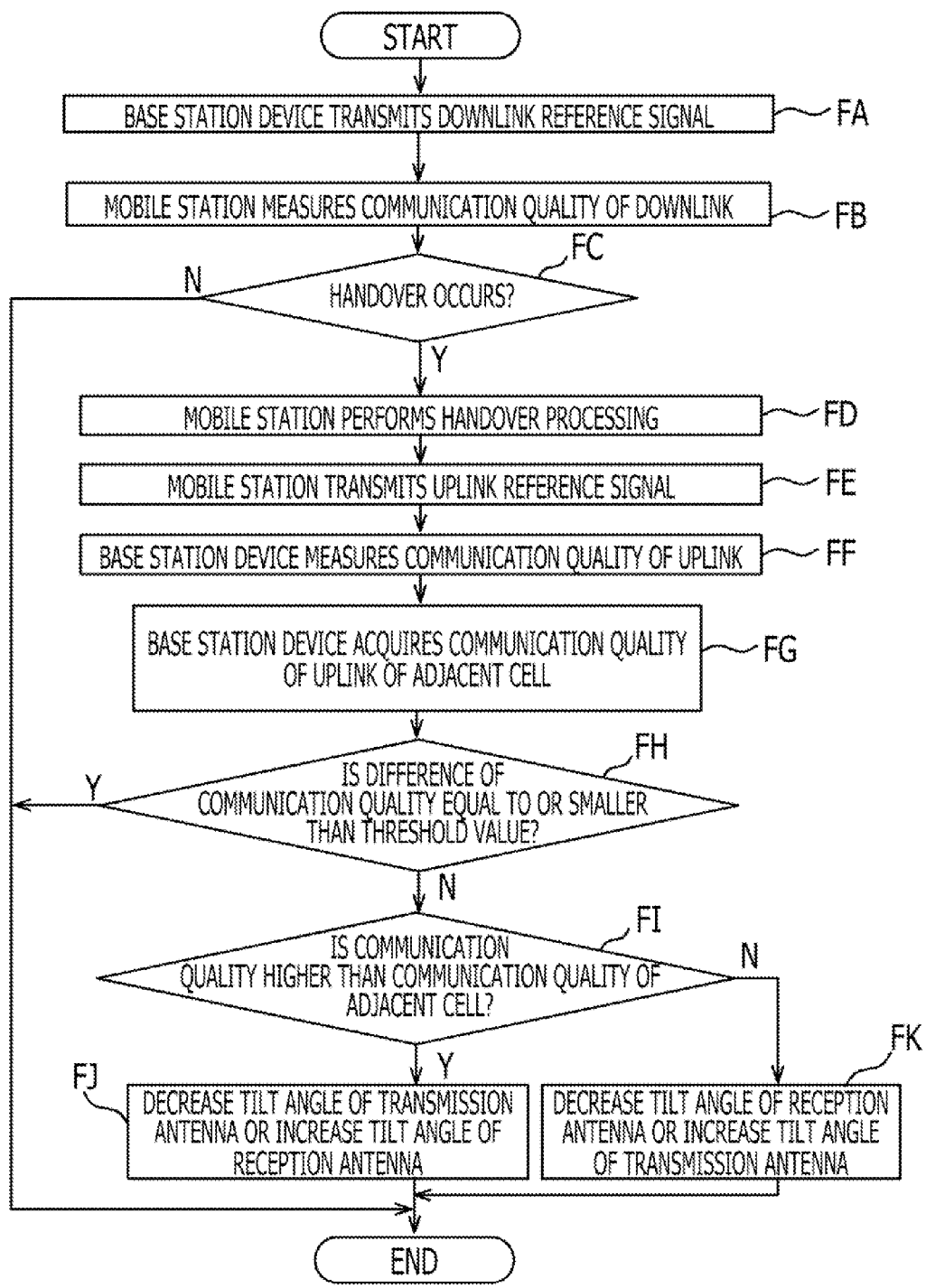

BASE STATION DEVICE, COMMUNICATION SYSTEM, AND CONTROL METHOD OF TILT ANGLE OF ANTENNA

CROSS-REFERENCE TO RELATED APPLICATIONS

This application is based upon and claims the benefit of priority from the prior Japanese Patent Application No. 2009-202712 filed on Sep. 2, 2009, the entire contents of which are incorporated herein by reference.

FIELD

The embodiments discussed herein relate to a base station device, a communication system, and a control method of a tilt angle of an antenna in a radio communication system.

BACKGROUND

In a mobile cellular network, geological communicable areas are divided into many cells, and each of the cells corresponds to a single base station. When power is supplied to a mobile station, the mobile station searches for a base station as a communication destination. In most cases, a cell search function is performed based on a cell-specific reference signal, which is periodically transmitted, or a preamble signal. In a basic method, the search is comprehensively performed by detecting all reference signals and then acquiring the best base station, based on some given criteria or factors, to serve as a communication destination.

There is a proposed method used in a mobile communication system in which a macrocell comprises a smaller microcell (see, for example, Japanese Laid-open Patent Publication No. 2007-514367). The above-described method includes a process for establishing an uplink communication cell boundary between a macrocell and a microcell, and a process for establishing a downlink communication cell boundary differently from the uplink communication cell boundary between the macrocell and the microcell. The uplink communication cell boundary is established to be wider than the downlink communication cell boundary. The downlink communication cell boundary is established by inclining a downlink antenna beam of the base station in association with the microcell transmitting a broadcast signal and by reducing a coverage area of the broadcast signal.

There is a proposed base station that includes a plurality of tilt beam antennas to cover substantially the same communication area and a beam tilt angle control unit that changes a tilt angle of at least one of the tilt beam antennas to make the tilt angle different from the tilt angles of the other beam antennas. The above-described base station performs rake combining on a level received by using at least two tilt beam antennas on an uplink line and transmits signals by using at least one tilt beam antenna with a higher reception level on a downlink line (see, for example, Japanese Laid-open Patent Publication No. 2007-28091).

With which cell the mobile station prefers to communicate differs according to whether the signal is the uplink or the downlink. The above-described state may be called "uplink-and-downlink asymmetric state."

The uplink-and-downlink asymmetric state may occur if, for example, the base station devices, which are arranged respectively in the adjacent cells, have different transmission power. Here, it is assumed that the base station devices having different transmission power are arranged in the adjacent two cells and that the mobile station is positioned in a position that is slightly closer to the base station device whose transmission power is relatively small than the base station device whose transmission power is relatively large. In this case, as for the downlink, reception power received from the base station device whose transmission power is relatively large is larger than the reception power of the base station device whose transmission power is relatively small. Therefore, it is preferable that the mobile station communicates with the base station device whose transmission power is relatively large.

On the other hand, as for the uplink, the base station device, which is closer to the mobile station and has the relatively small transmission power, has the reception power that is larger than the reception power of the base station device whose transmission power is relatively large. Accordingly, it is preferable that the mobile station communicates with the base station device whose transmission power is relatively small.

If the uplink-and-downlink asymmetric state occurs, interference power received by the other cell is larger than the reception power of the uplink received by the communicating cell. This may cause deterioration of the communication quality in the uplink.

SUMMARY

According to an aspect of the invention, a base station device includes a first antenna which transmits a radio signal in a downlink, a second antenna which receives a radio signal in an uplink, and a tilt angle control unit which controls a tilt angle of the first antenna and the second antenna to decrease a difference in a position of a cell boundary of the downlink and a position of the cell boundary of the uplink based on a communication quality of the downlink and a communication quality of the uplink with respect to a first base station device and on the communication quality of a downlink and a communication quality of the uplink with respect to an adjacent second base station device.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 21 is an explanation diagram of an example of correspondence relation information, FIG. 26 is an explanation diagram of a control example of a tilt angle of an antenna in the radio communication system illustrated in FIG. 23.

DESCRIPTION OF EMBODIMENTS

Figure 1:
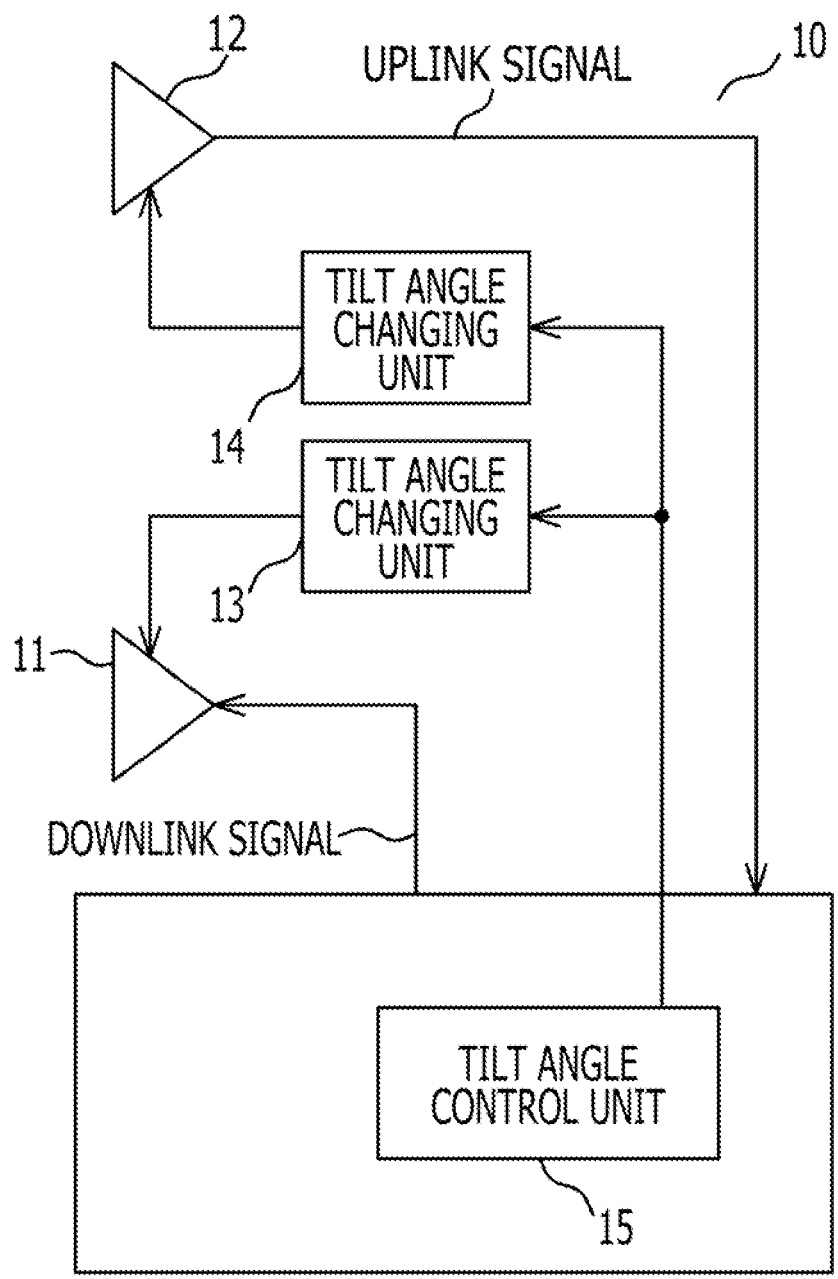
FIG. 1 is a configuration diagram of an embodiment of a base station device.

With reference to the attached diagrams, description will be made of embodiments of the present invention. FIG. 1 is a configuration diagram of an embodiment of a base station device. Reference numeral 10 indicates a base station device. Reference numeral 11 indicates a transmission antenna. Reference numeral 12 indicates a reception antenna. Reference numeral 13 and reference numeral 14 indicate tilt angle changing units. Reference numeral 15 indicates a tilt angle control unit.

The base station device 10 includes the transmission antenna 11, the reception antenna 12, the tilt angle changing units 13 and 14, and the tilt angle control unit 15. The transmission antenna 11 transmits, from the base station device 10, a radio signal in a downlink transmitted to a mobile station, for example. The reception antenna 12 receives a radio signal in an uplink transmitted to the base station device 10 from, e.g. the mobile station. The transmission antenna 11 and the reception antenna 12 are given as an example of a first antenna and a second antenna, respectively; however, the base station device 10 may include one or more of each of a transmission antenna 11 and reception antenna 12.

The tilt angle changing units 13 and 14 change the tilt angle of a main beam of an antenna gain pattern of the transmission antenna 11 and the reception antenna 12, respectively. In this case, the "tilt angle" may be a depression angle, which is an angle between a vertical in-plane direction and the horizontal direction of the main beam of the antenna gain pattern of the transmission antenna 11 and the reception antenna 12. For simple description, the tilt angle of the main beam of the antenna gain pattern of the transmission antenna 11 and the reception antenna 12 may be described as the tilt angle of the transmission antenna 11 and the reception antenna 12, respectively.

As described below, the tilt angle control unit 15 controls at least either of the tilt angle of the transmission antenna 11 and the tilt angle of the reception antenna 12 by controlling at least either of the tilt angle changing unit 13 and the tilt angle changing unit 14.

Figure 2:
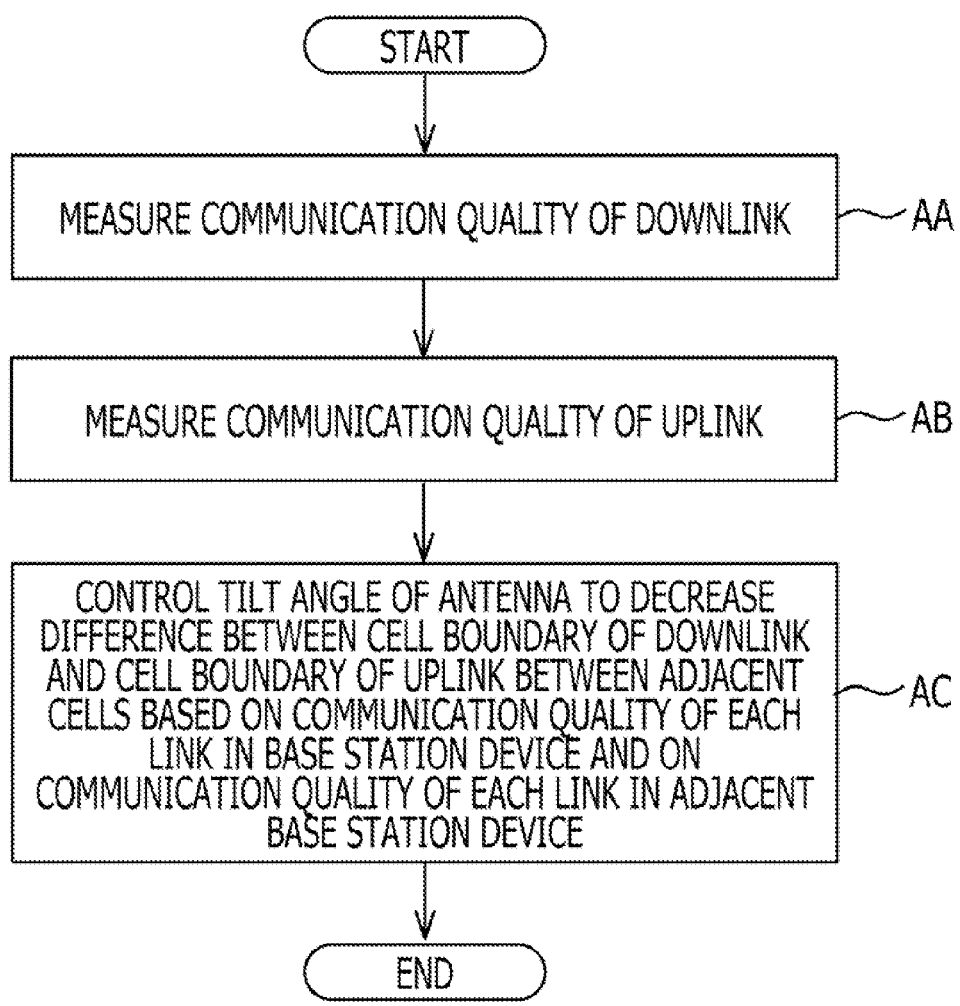
FIG. 2 is an explanation diagram of an embodiment of a control method of a tilt angle.

FIG. 2 is an explanation diagram of an embodiment of a control method of a tilt angle. In Operation AA, a communication quality of the downlink between the base station device 10 and each of the other base station devices, which are arranged in a cell that is adjacent to the cell in which the base station device 10 is arranged, is measured. For convenience of the description, the other base station device arranged in the adjacent cell may be described as an "adjacent base station device."

For example, by receiving the radio signal transmitted from each of the base station device 10 and the adjacent base station device, the mobile station or the other communication device may measure the communication quality of the downlink with respect to the base station device 10 and the adjacent base station device.

In Operation AB, the communication quality of the uplink is measured with respect to the base station device 10 and the adjacent base station device, respectively. For example, by receiving the radio signal transmitted from the mobile station device or the other communication device, the base station device or the other communication device may measure the communication quality of the downlink with respect to the base station device and the other base station device, respectively.

Alternatively, for example, by receiving each of the radio signals transmitted from the base station device 10 and the adjacent base station device, the mobile station or the communication device may measure the communication quality of the downlink with respect to the base station device 10 and the adjacent base station device, respectively. In this case, the communication quality of the downlink may be determined based on transmission loss obtained by subtracting the reception power measured by the mobile station or the communication device from the known transmission power of the base station device 10 or the adjacent base station device. Either of Operation AA and Operation AB may be performed first.

In Operation AC, the tilt angle control unit 15 controls at least either of the tilt angle of the transmission antenna 11 and the tilt angle of the reception antenna 12 based on each of the communication qualities of the uplink and the downlink with respect to the base station device 10 and on each communication quality of the uplink and the downlink with respect to the adjacent base station device. At this time, the tilt angle control unit 15 controls at least either of the tilt angle of the transmission antenna 11 and the tilt angle of the reception antenna 12, so that a difference in a position of the cell boundary of the downlink between the cell in which the base station device 10 and the adjacent cell in which the adjacent base station device is arranged and a position of the cell boundary of the uplink therebetween is decreased.

For example, when the cell boundary of the downlink is farther than the cell boundary of the uplink from the base station device 10, the tilt angle control unit 15 increases the tilt angle of the transmission antenna 11 to reduce the cell of the downlink. Furthermore or instead, the tilt angle control unit 15 decreases the tilt angle of the reception antenna 12 to enlarge the cell of the uplink. Moreover, when the cell boundary of the uplink is farther than the cell boundary of the downlink from the base station device 10, the tilt angle control unit 15 increases the tilt angle of the reception antenna 12 to reduce the cell of the uplink. Furthermore or instead, the tilt angle control unit 15 increases the tilt angle of the transmission antenna 11 to enlarge the cell of the downlink.

Based on each of the communication qualities of the uplink and the downlink and on each communication quality of the uplink and the downlink with respect to the base station device 10, determination is made to determine whether the cell boundary of the uplink or the cell boundary of the uplink is closer to the base station device 10.

For example, when the communication quality of each of the downlink and the uplink is measured between the communication device near the cell boundary and the base station device 10 and between the communication device near the cell boundary and the adjacent base station device, the measurement indicates whether the cell boundary of the uplink or the cell boundary of the downlink is closer to the base station device 10. That is, based on the difference of the communication quality of the downlink between the base station device 10 and the adjacent base station device and on the difference of the communication quality of the uplink between the base station device 10 and the adjacent base station device, the determination may be made to determine whether the cell boundary of the uplink or the cell boundary of the uplink is closer to the base station device 10.

Therefore, for example, the tilt angle control unit 15 may control the tilt angle of the transmission antenna 11, so that the difference between the communication quality of the downlink between the communication device positioned in a prescribed position and the base station device 10 and the communication quality of the downlink between the communication device and the adjacent base station device may be decreased. For example, the tilt angle control unit 15 may control the tilt angle of the reception antenna, so that the difference between the communication quality of the uplink between the communication device positioned in the prescribed position and the base station device 10 and the communication quality of the downlink between the communication device and the adjacent base station device may be decreased.

Moreover, for example, as for a plurality of mobile stations, by determining the base station device in which the highest communication quality is measured on each of the uplink and the downlink, determination may be made to determine whether the cell boundary of the downlink or the cell boundary of the uplink is closer to the base station device 10. At this time, the determination is made to determine groups of the mobile stations. The mobile station device belongs to Group A if the base station device in which the highest communication quality of the downlink is measured is the base station device 10. The mobile station device belongs to Group B if the base station device in which the highest communication quality of the uplink is measured is the base station device 10.

If the number of the mobile stations belonging to Group A is larger than the number of the mobile stations belonging to Group B, the cell boundary of the uplink is closer than the cell boundary of the downlink to the base station device 10. If the number of the mobile stations belonging to Group B is larger than the number of the mobile stations belonging to Group A, the cell boundary of the downlink is closer than the cell boundary of the uplink to the base station device 10. Therefore, for example, the tilt angle control unit 15 may control at least either of the tilt angle of the transmission antenna 11 and the tilt angle of the reception antenna 12, so that mismatch between the number of the mobile stations belonging to Group A and Group B is reduced.

An example that the mobile station in which a handover occurs is close to the cell boundary of the downlink may be used. That is, by measuring the communication quality of the uplink between the mobile station in which the handover occurs and the base station device 10 and between the mobile station in which the handover occurs and the adjacent base station device, respectively, the determination may be made to determine whether the cell boundary of the uplink or the cell boundary of the downlink is closer to the base station device 10.

Therefore, for example, the tilt angle control unit 15 controls the tilt angle to decrease the difference between the communication quality of the uplink between the mobile station performing handover processing and the base station device 10 and the communication quality of the uplink between the mobile station and the adjacent base station device.

According to the present embodiment, at least either of the tilt angle of the transmission antenna 11 and the tilt angle of the reception antenna 12 may be controlled, so that the difference between the cell boundary of the downlink and the cell boundary of the uplink between the adjacent cells is decreased.

It is assumed that the base station devices, which have different transmission power, are arranged in two adjacent cells, respectively. By the above-described control, the tilt angle of the transmission antenna 11 in the base station device whose transmission power is relatively large may be controlled to be larger than the tilt angle of the reception antenna 12, for example. If the tilt angle is controlled as described above, the cell radius of the downlink of the cell in which the base station device whose transmission power is relatively large is decreased, and the cell radius of the uplink thereof is enlarged.

On the other hand, the tilt angle of the transmission antenna 11 in the base station device whose transmission power is relatively small may be controlled to be smaller than the tilt angle of the reception antenna 12, for example. If the tilt angle is controlled as described above, the cell radius of the downlink of the cell in which the base station device whose transmission power is relatively small is enlarged, and the cell radius of the uplink thereof is decreased.

Figure 3:
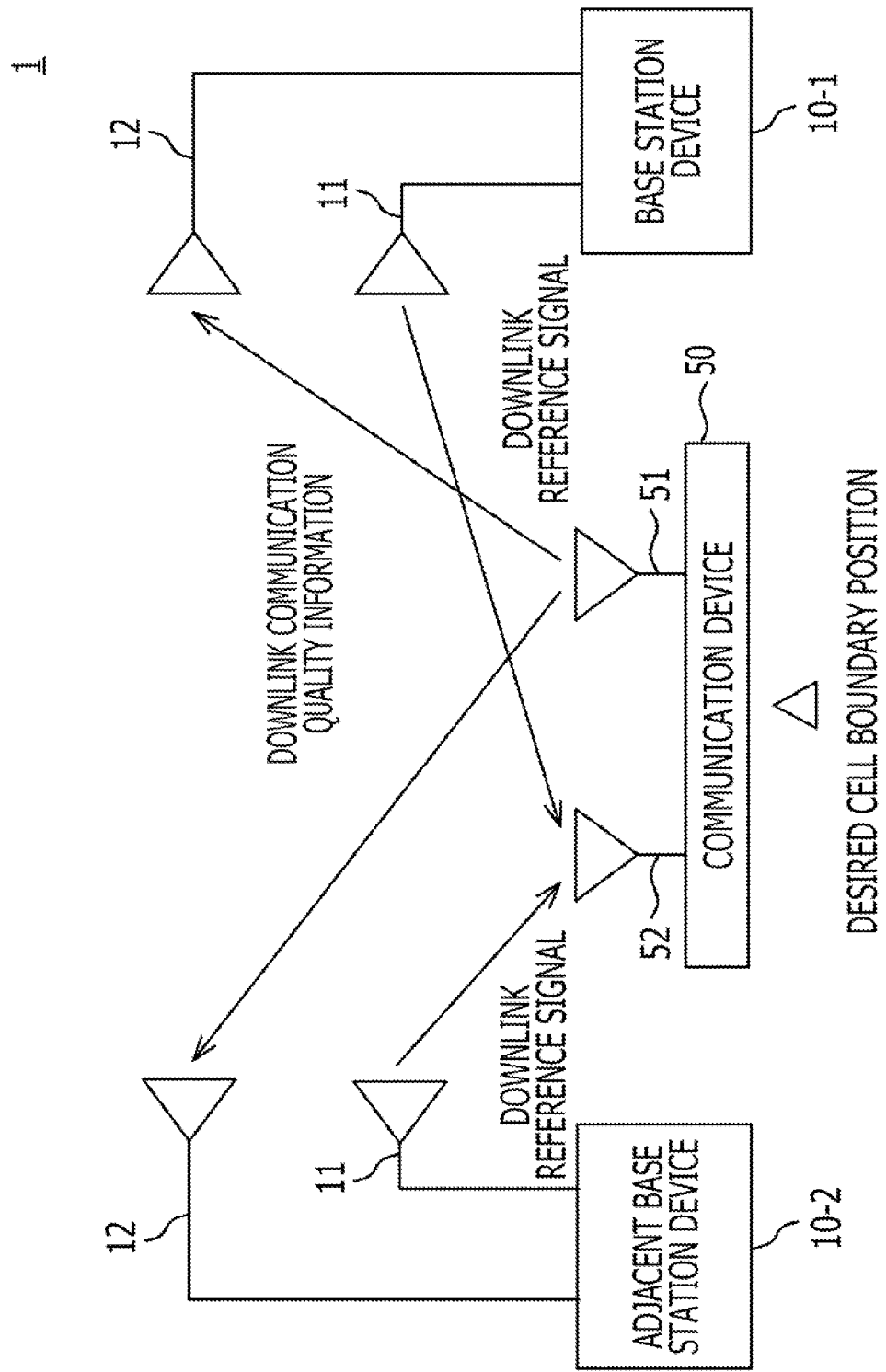
FIG. 3 is a configuration diagram of a first embodiment of a radio communication system.

Next, description will be made of embodiments of a radio communication system that includes a base station device. FIG. 3 is a configuration diagram of a first embodiment of the radio communication system. Reference numeral 10-1 indicates a base station device. Reference numeral 10-2 indicates an adjacent base station device. Reference Numeral 50 indicates a communication device. Reference numeral 51 indicates a transmission antenna of the communication device 50. Reference numeral 52 indicates a reception antenna of the communication device 50.

A radio communication system 1 includes the base station device 10-1 and the adjacent base station device 10-2. According to the present embodiment, the communication device 50 is arranged in a desired cell boundary position that is previously prescribed as a target position of the cell boundary of the downlink to adjust the tilt angle of the transmission antenna 11 of the base station device 10-1. For example, a middle position between the cell boundary of the downlink and the cell boundary of the uplink before the adjustment of the tilt angle of the transmission antenna 11 and/or the reception antenna 12 may be used as the above-described target position.

Each of the base station device 10-1 and the adjacent base station device 10-2 transmits, to the communication device 50, a downlink reference signal for communication quality measurement in the downlink. The communication device 50 measures the communication quality of the downlink between the base station device 10-1 and the communication device 50 and measures the communication quality of the downlink between the adjacent base station device 10-2 and the communication device 50 in the above-described desired target position.

Figure 4:
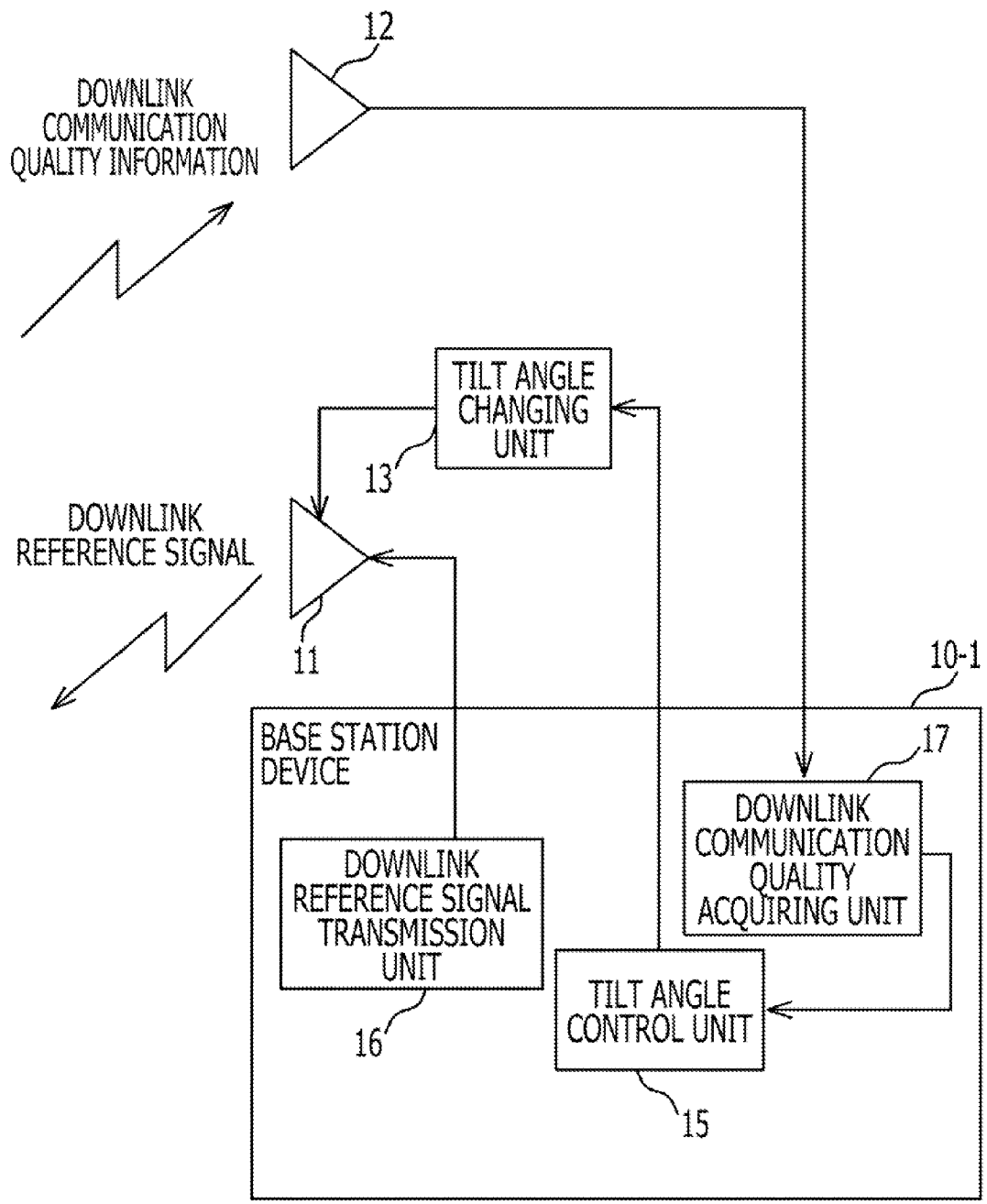
FIG. 4 is a diagram illustrating a first example of a configuration of a base station device illustrated in FIG. 3.

FIG. 4 is a diagram illustrating a first example of the configuration of the base station device 10-1 illustrated in FIG. 3. The adjacent base station device 10-2 may have the similar configuration as the base station device 10-1. This may be said to the following other embodiments. Reference numeral 16 indicates a downlink reference signal transmission unit. Reference numeral 17 indicates a downlink communication quality acquiring unit. The same components as in FIG. 1 have the same reference numerals that are used in FIG. 1.

The base station device 10-1 includes the transmission antenna 11, the reception antenna 12, the tilt angle changing unit 13, the tilt angle control unit 15, the downlink reference signal transmission unit 16, and the downlink communication quality acquiring unit 17. The downlink reference signal transmission unit 16 transmits the downlink reference signal through the transmission antenna 11. The downlink reference signal is used when the communication device 50 measures the communication quality of the downlink between the base station device 10-1 and the communication device 50.

The downlink communication quality acquiring unit 17 receives downlink communication quality information, which is transmitted from the communication device 50 and indicates the communication quality of the downlink between the base station device 10-1 and the communication device 50. Moreover, the downlink communication quality acquiring unit 17 may receive the downlink communication quality information with respect to the downlink between the adjacent base station device 10-2 and the communication device 50.

Figure 5:
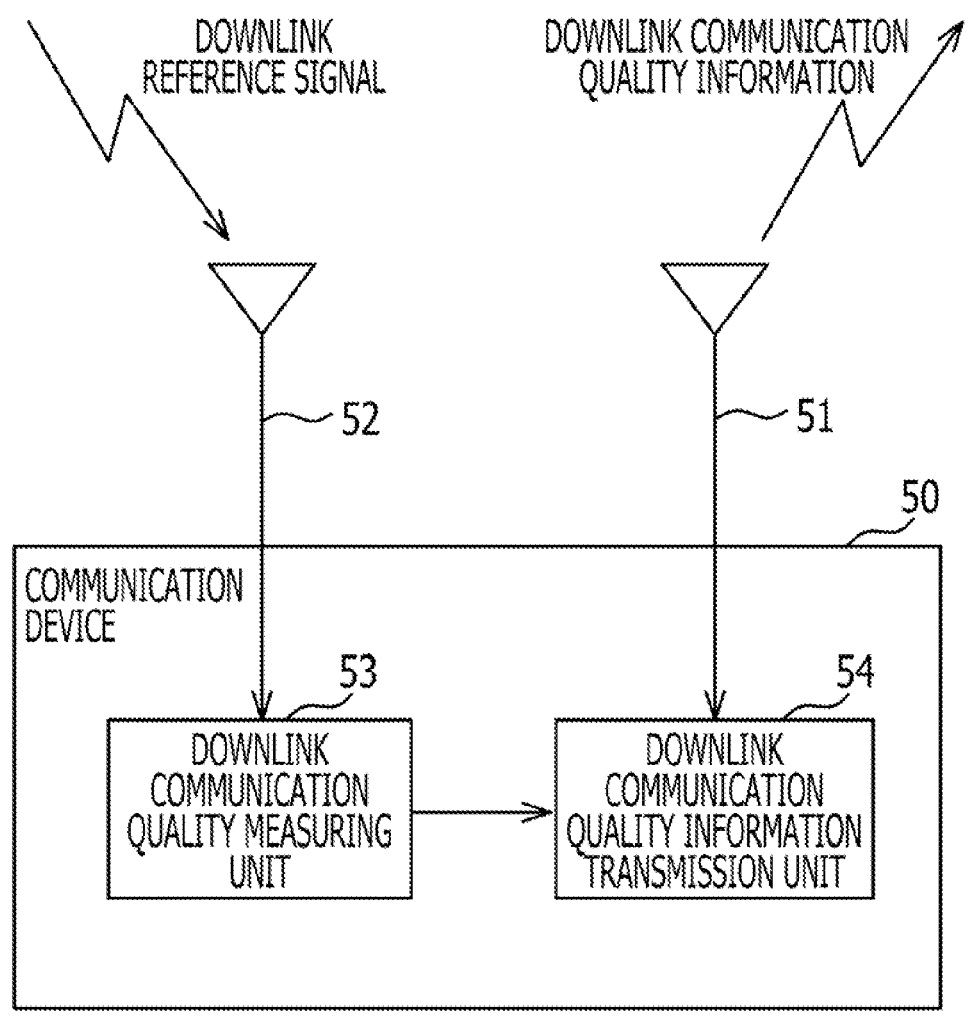
FIG. 5 is a diagram illustrating a configuration example of a communication device illustrated in FIG. 3.

FIG. 5 is a diagram illustrating a configuration example of the communication device 50 illustrated in FIG. 3. Reference numeral 53 indicates a downlink communication quality measuring unit. Reference numeral 54 indicates a downlink communication quality information transmission unit. The communication device 50 includes the transmission antenna 51, the reception antenna 52, the downlink communication quality measuring unit 53, and the downlink communication quality information transmission unit 54.

The downlink communication quality measuring unit 53 measures the communication quality of the downlink between the base station device 10-1 and the communication device 50 and measures the communication quality of the downlink between the adjacent base station device 10-2 and the communication device 50. For example, the downlink communication quality measuring unit 53 may measure the reception power of the downlink reference signals, which are transmitted from the base station device 10-1 and the adjacent base station device 10-2, respectively, as the communication quality of the downlink.

The downlink communication quality information transmission unit 54 transmits, to the base station device 10-1, the downlink communication quality information indicating the communication quality of the downlink measured between the base station device 10-1 and the communication device 50. The downlink communication quality information transmission unit 54 may transmit, to the base station device 10-1, the downlink communication quality information indicating the communication quality of the downlink measured between the adjacent base station device 10-2 and the communication device 50.

Figure 6:
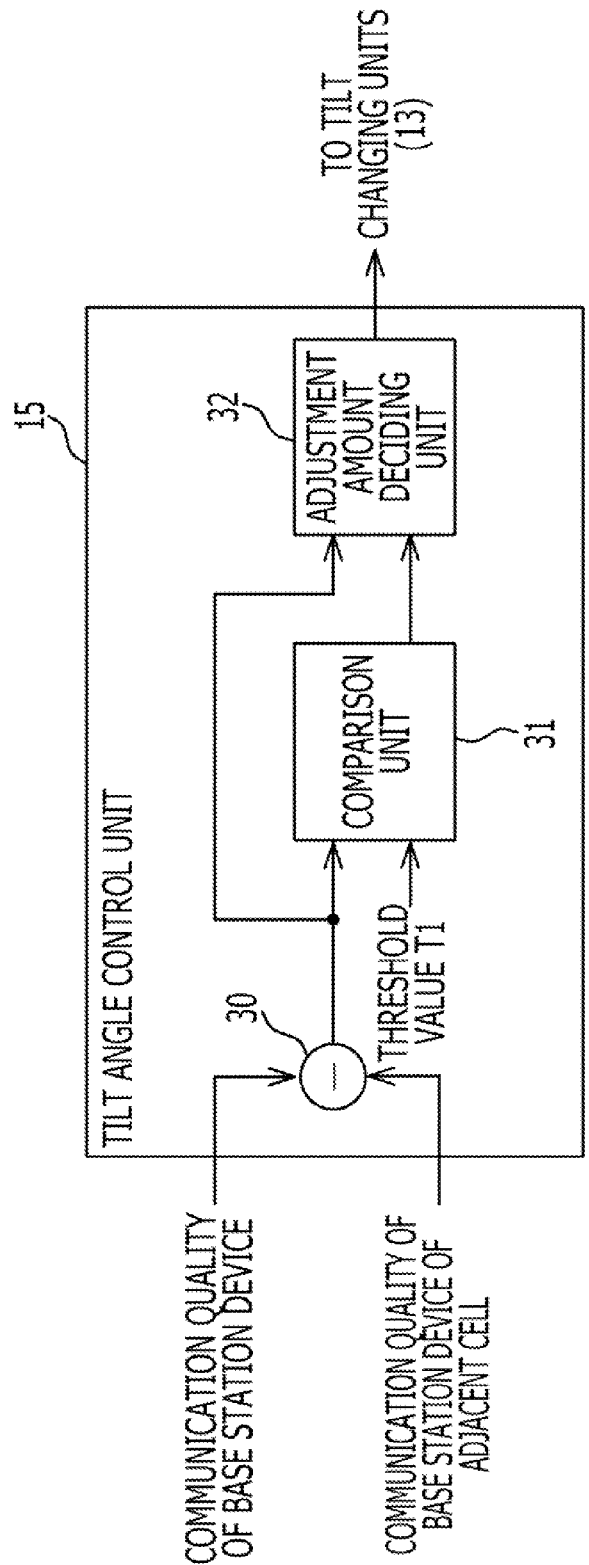
FIG. 6 is a diagram illustrating a configuration example of a tilt angle control unit illustrated in FIG. 4.

FIG. 6 is a diagram illustrating a configuration example of the tilt angle control unit 15 illustrated in FIG. 4. Reference numeral 30 indicates a subtracter. Reference numeral 31 indicates a comparison unit. Reference numeral 32 indicates an adjustment amount deciding unit. The tilt angle control unit 15 includes the subtracter 30, the comparison unit 31, and the adjustment amount deciding unit 32.

The subtracter 30 inputs the downlink communication quality information indicating the measured communication quality of the downlinks between the base station device 10-1 and the communication device 50 and between the adjacent base station device 10-2 and the communication device 50, respectively. The subtracter 30 calculates the difference of the communication quality of the downlinks measured between the base station device 10-1 and the communication device 50 and between the adjacent base station device 10-2 and the communication device 50, respectively.

The comparison unit 31 compares the difference of the communication quality to a prescribed threshold value T1. If the difference of the communication quality is larger than the prescribed threshold value T1, the adjustment amount deciding unit 32 decides an adjustment amount to adjust the tilt angle of the transmission antenna 11. For example, if the communication quality between the base station device 10-1 and the communication device 50 is higher than the communication quality between the adjacent base station device 10-2 and the communication device 50, the adjustment amount deciding unit 32 decides the adjacent amount to increase the tilt angle of the transmission antenna 11. On the other hand, if the communication quality between the adjacent base station device 10-2 and the communication device 50 is higher than the communication quality between the base station device 10-1 and the communication device 50, the adjustment amount deciding unit 32 decides the adjustment amount to decrease the tilt angle of the transmission antenna 11.

The adjustment amount deciding unit 32 may decide the adjustment amount based on, for example, a table and a calculating formula that previously determine a relation between the difference of the communication quality and the adjustment amount of the tilt angle. Moreover, for example, the adjustment amount decided in one adjustment by the adjustment amount deciding unit 32 may be the adjustment amount of a fixed step angle $\Delta\theta$.

The tilt angle changing unit 13 illustrated in FIG. 4 mechanically or electrically changes the tilt angle of the transmission antenna 11 based on the adjustment amount decided by the adjustment amount deciding unit 32.

Figure 7:
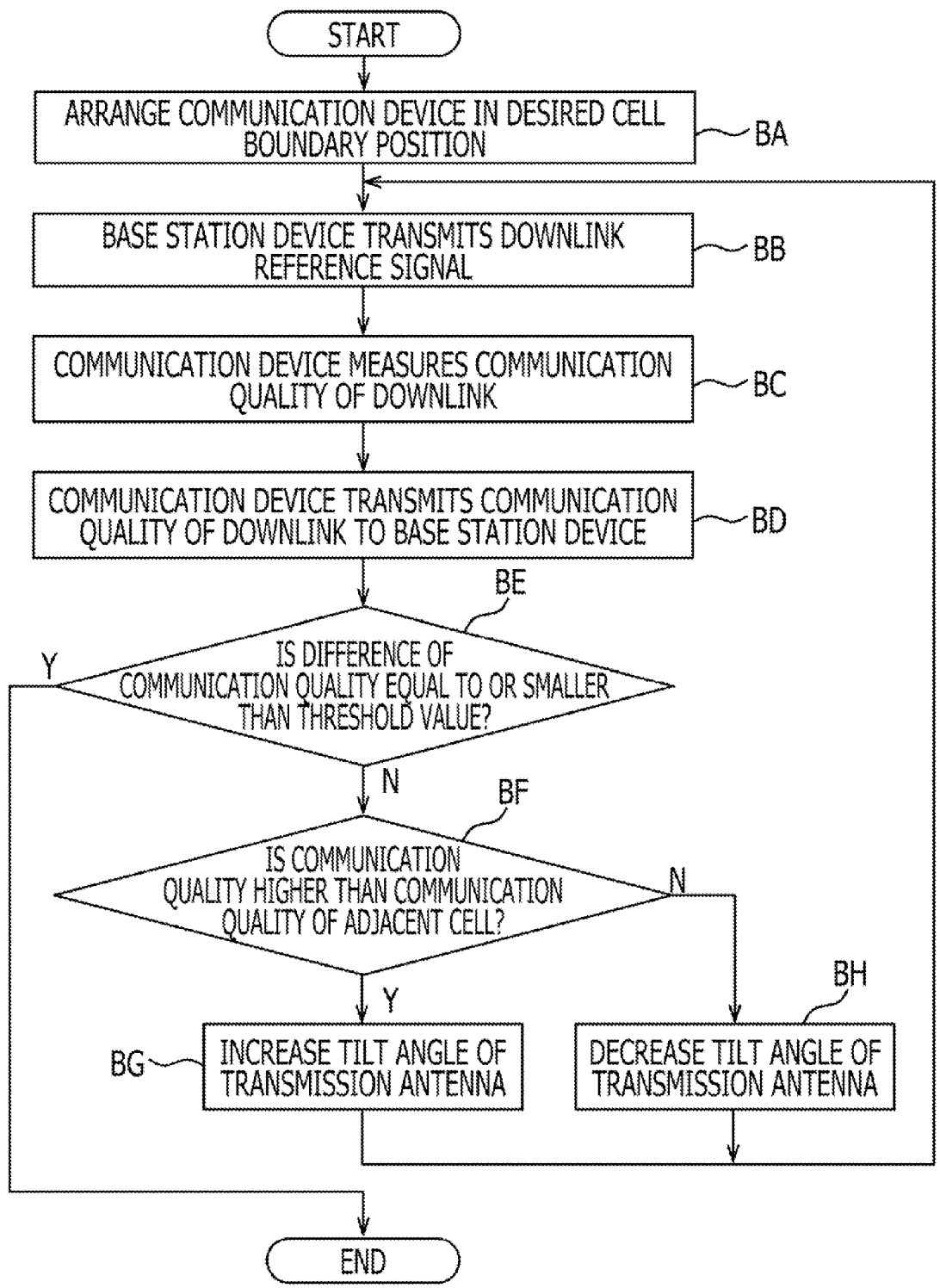
FIG. 7 is an explanation diagram of a control example of a tilt angle of a transmission antenna in the radio communication system illustrated in FIG. 3.

FIG. 7 is an explanation diagram of a control example of the tilt angle of the transmission antenna in the radio communication system illustrated in FIG. 3. In Operation BA, an operator, who adjusts the tilt angle of the transmission antenna 11, arranges the communication device 50 in the desired cell boundary position.

In Operation BB, the downlink reference signal transmission unit 16 of the base station device 10-1 and of the adjacent base station device 10-2 transmits the downlink reference signal, respectively. In Operation BC, the downlink communication quality measuring unit 53 of the communication device 50 measures the communication quality of the downlink between the base station device 10-1 and the communication device 50 and measures the communication quality of the downlink between the adjacent base station device 10-2 and the communication device 50.

In Operation BD, the downlink communication quality information transmission unit 54 transmits, to the base station device 10-1, the downlink communication quality information with respect to each of the downlinks between the base station device 10-1 and the communication device 50 and between the adjacent base station device 10-2 and the communication device 50.

In Operation BE, the tilt angle control unit 15 of the base station device 10-1 determines whether or not if the difference of the communication quality of each of the downlinks between the base station device 10-1 and the communication device 50 and between the adjacent base station device 10-2 and the communication device 50 is smaller than or equal to the threshold value T1. If the difference of the communication quality is smaller than or equal to the threshold value T1 (Y in Operation BE), the processing ends. If the difference of the communication quality is not smaller than or equal to the threshold value T1 (N in Operation BE), the process goes to Operation BF.

In Operation BF, the tilt angle control unit 15 determines whether or not if the communication quality between the base station device 10-1 and the communication device 50 is higher than the communication quality between the adjacent base station device 10-2 and the communication device 50. The communication quality between the base station device 10-1 and the communication device 50 is higher than the communication quality between the adjacent base station device 10-2 and the communication device 50 (Y in Operation BF), the process goes to Operation BG. If the communication quality between the base station device 10-1 and the communication device 50 is not higher than the communication quality between the adjacent base station device 10-2 and the communication device 50 (N in Operation BF), the process goes to Operation BH.

In Operation BG, the adjustment amount deciding unit 32 decides the adjustment amount to increase the tilt angle of the transmission antenna 11. In Operation BH, the adjustment amount deciding unit 32 decides the adjustment amount to decrease the tilt angle of the transmission antenna 11. The tilt angle changing unit 13 changes the tilt angle of the transmission antenna 11 based on the decided adjustment amount. After Operation BG or Operation BH, the process goes back to Operation BB. Operations BB to BH are repeated until the difference of the communication quality reaches or becomes smaller than the threshold value T1 in the determination in Operation BE.

According to the present embodiment, the tilt angle of the transmission antenna 11 may be adjusted in that the cell boundary of the downlink is positioned closer to the desired target position. Therefore, according to the present embodiment, the position of the cell boundary of the downlink may be controlled when the difference between the cell boundary of the downlink and the cell boundary of the uplink between the adjacent cells may be eliminated or decreased.

Figure 8:
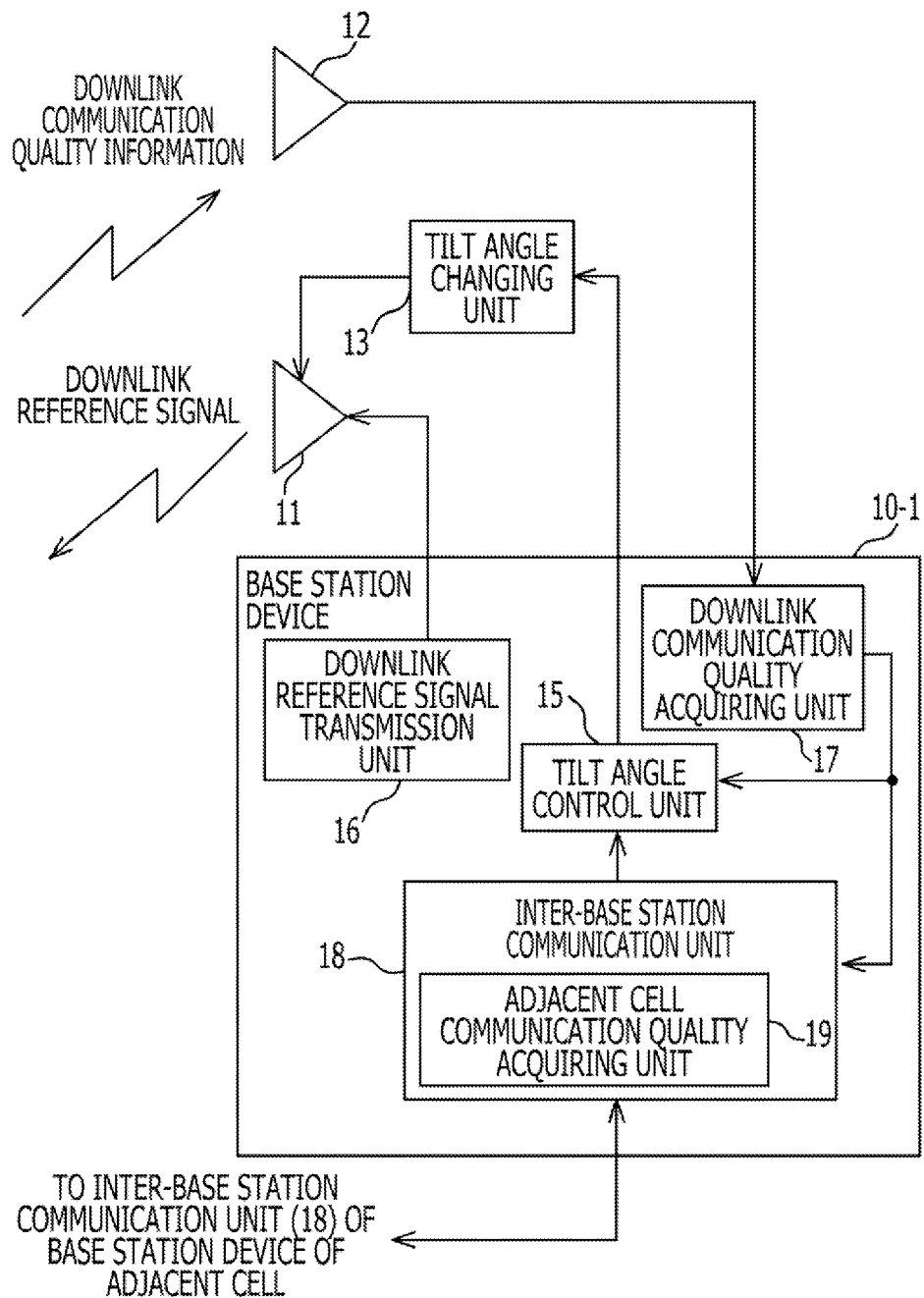
FIG. 8 is a diagram illustrating a second example of the configuration of the base station device illustrated in FIG. 3.

FIG. 8 is a diagram illustrating a second example of the configuration of the base station device 10-1 illustrated in FIG. 3. Reference numeral 18 indicates an inter-base station communication unit. Reference numeral 19 indicates an adjacent cell communication quality acquiring unit. The same components as in FIG. 4 have the same reference numerals that are used in FIG. 4. The base station device 10-1 includes the transmission antenna 11, the reception antenna 12, the tilt angle changing unit 13, the tilt angle control unit 15, the downlink reference signal transmission unit 16, the downlink communication quality acquiring unit 17, and the inter-base station communication unit 18. The inter-base station communication unit 18 includes the adjacent cell communication quality acquiring unit 19.

In the embodiments described with reference to FIG. 3 to FIG. 7, the communication device 50 transmits, to the base station device 10-1, the downlink communication quality information with respect to both the downlinks between the base station device 10-1 and the communication device 50 and between the adjacent base station device 10-2 and the communication device 50.

Instead, the communication device 50 according to the present embodiment transmits, to the base station device 10-1, the downlink communication quality information between the base station device 10-1 and the communication device 50, and transmits, to the adjacent base station device 10-2, the downlink communication quality information between the adjacent base station device 10-2 and the communication device 50. The adjacent base station device 10-2 transmits the transmitted downlink communication quality information to the base station device 10-1 by the inter-base station communication unit 18. The adjacent cell communication quality acquiring unit 19 of the base station device 10-1 acquires the downlink communication quality information, transmitted from the adjacent base station device 10-2, between the adjacent base station device 10-2 and the communication device 50.

According to the present embodiment, the base station device 10-1 may acquire the downlink communication quality information with respect to both the downlinks between the base station device 10-1 and the communication device 50 and between the adjacent base station device 10-2 and the communication device 50.

Figure 9:
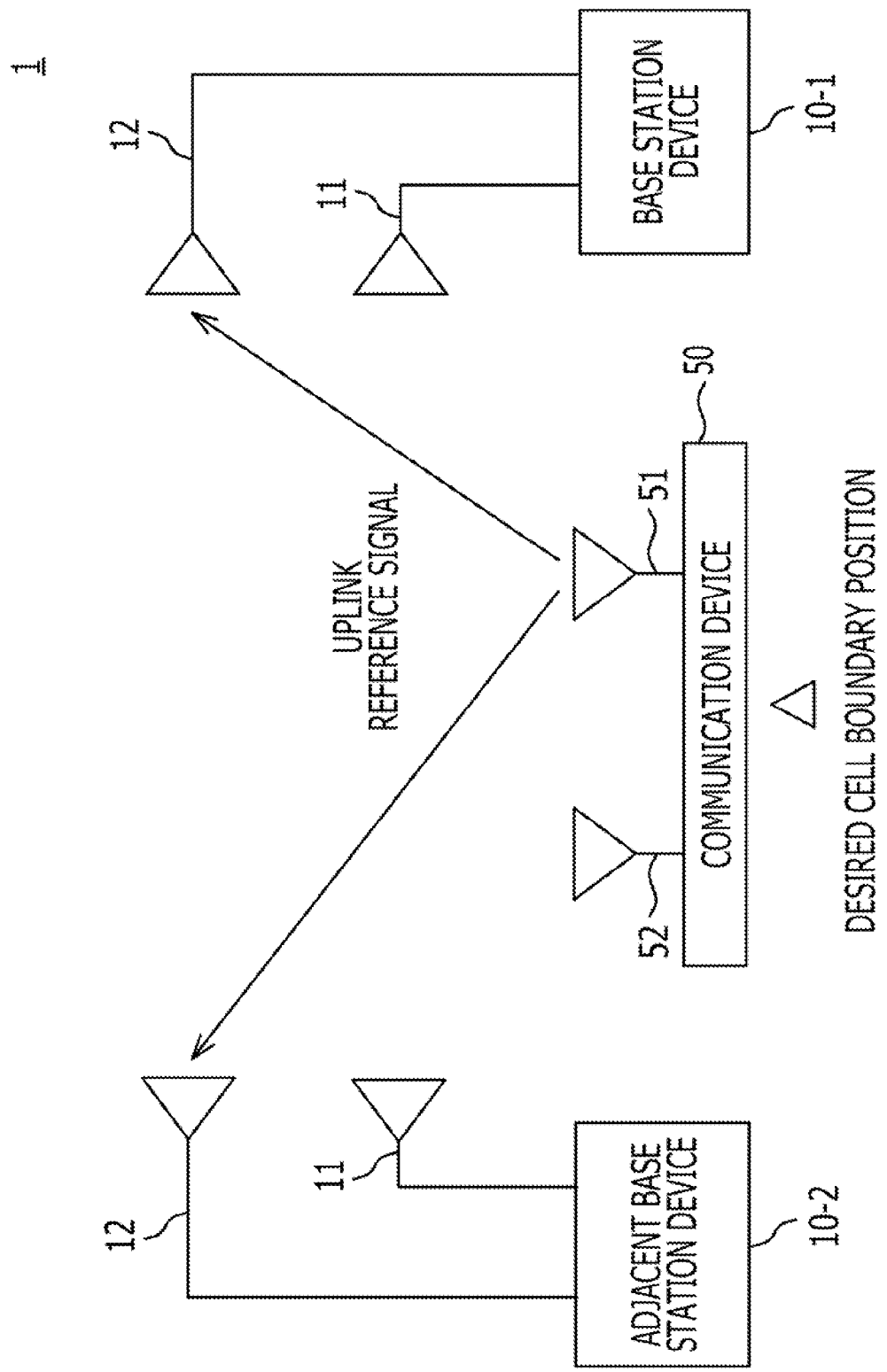
FIG. 9 is a configuration diagram of a second embodiment of the radio communication system.

Next, description will be made of other embodiments of the radio communication system. FIG. 9 is a configuration diagram of a second embodiment of the radio communication system. In the present embodiment, the communication device 50 is arranged in the desired cell boundary position, which is previously specified as the desired target position of the cell boundary of the downlink, to adjust the tilt angle of the transmission antenna 11 of the base station device 10-1.

The communication device 50 transmits, from the above-described desired target position, the uplink reference signal for the communication quality measurement in the uplink. The base station device 10-1 measures the communication quality of the uplink between the base station device 10-1 and the communication device 50 by receiving the uplink reference signal transmitted from the communication device 50. In the same manner, the adjacent base station device 10-2 measures the communication quality of the uplink between the adjacent base station device 10-2 and the communication device 50.

The base station device 10-1 according to the present embodiment may include the configuration illustrated in FIG. 4 to adjust the tilt angle of the transmission antenna 11. In the same manner, the communication device 50 according to the present embodiment may include the configuration illustrated in FIG. 5 to adjust the tilt angle of the transmission antenna 11 of the base station device 10-1.

Figure 10:
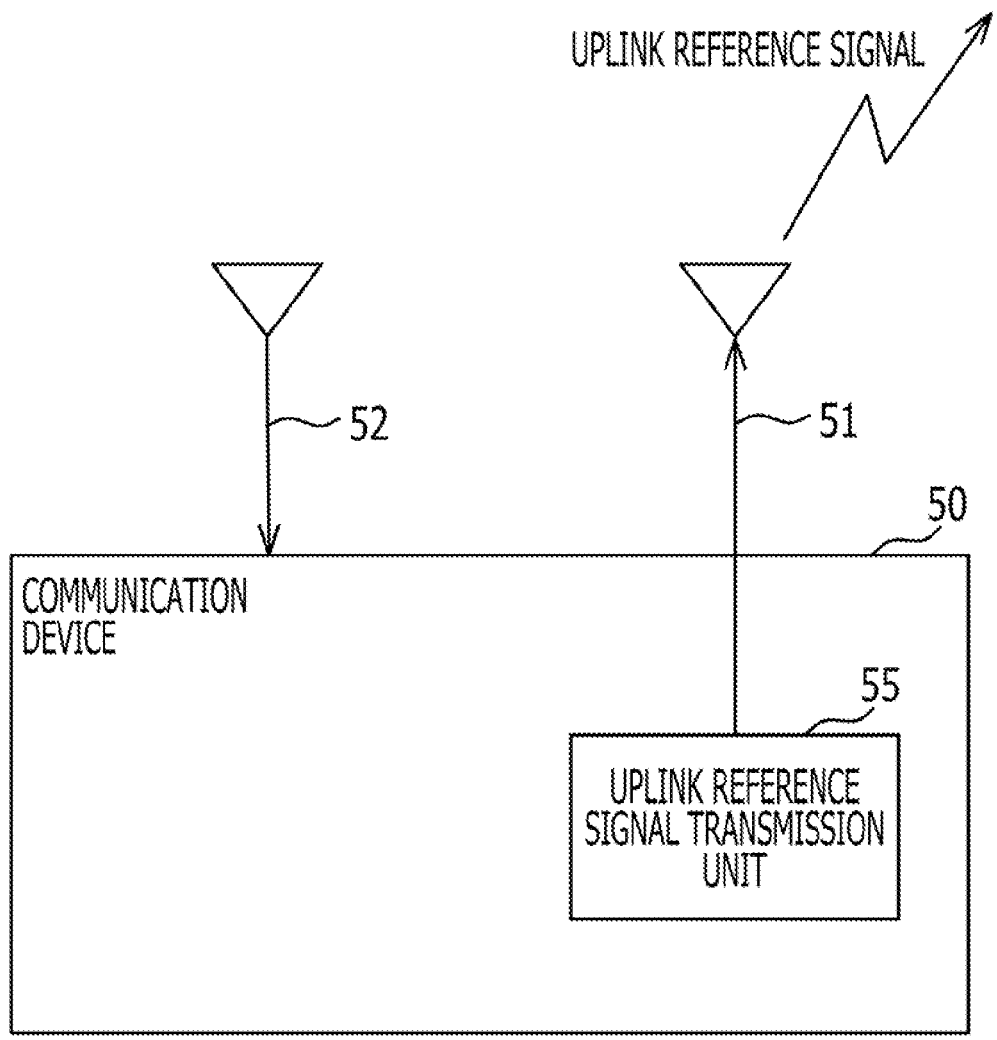
FIG. 10 is a diagram illustrating a configuration example of a communication device illustrated in FIG. 9.

FIG. 10 is a diagram illustrating a configuration example of the communication device 50 illustrated in FIG. 9. Reference numeral 55 indicates an uplink reference signal transmission unit. The same components as in FIG. 5 have the same reference numerals that are used in FIG. 5. The communication device 50 includes the transmission antenna 51, the reception antenna 52, and the uplink reference signal transmission unit 55. The uplink reference signal transmission unit 55 transmits the uplink reference signal through the transmission antenna 51. The uplink reference signal is used when the base station device 10-1 measures the communication quality of the uplink between the base station device 10-1 and the communication device 50.

Figure 11:
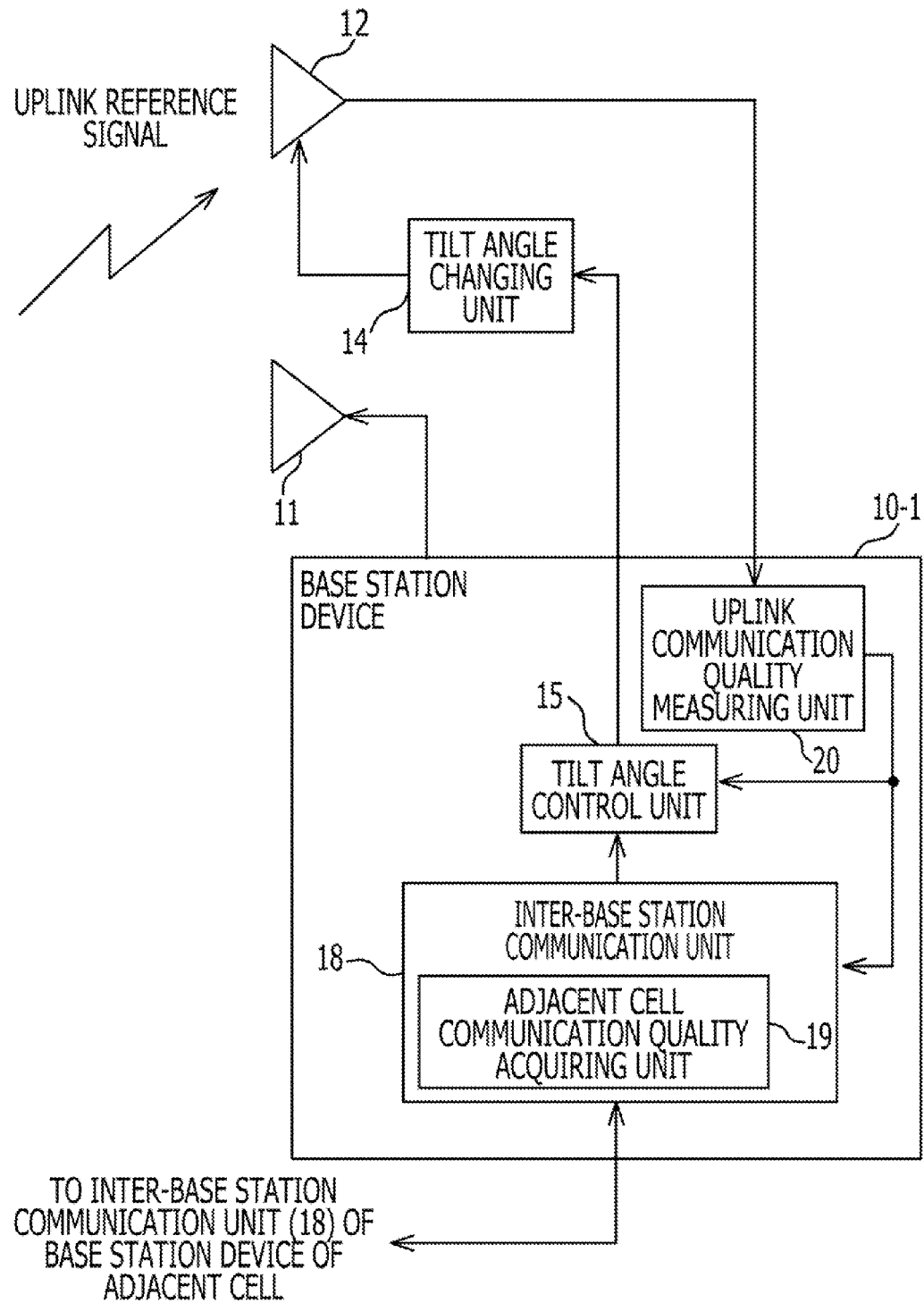
FIG. 11 is a diagram illustrating a configuration example of a base station device illustrated in FIG. 9.

FIG. 11 is a diagram illustrating a configuration example of the base station device 10-1 illustrated in FIG. 9. Reference numeral 20 indicates an uplink communication quality measuring unit. The same components as in FIG. 1 or FIG. 8 have the same reference numerals that are used in FIG. 1 or FIG. 8. The base station device 10-1 includes the transmission antenna 11, the reception antenna 12, the tilt angle changing unit 14, the tilt angle control unit 15, the inter-base station communication unit 18, and the uplink communication quality measuring unit 20. The inter-base station communication unit 18 includes the adjacent cell communication quality acquiring unit 19.

The uplink communication quality measuring unit 20 measures the communication quality of the uplink between the base station device 10-1 and the communication device 50. For example, the uplink communication quality measuring unit 20 may measure the reception power of the uplink reference signal, which is transmitted from the communication device 50, as the communication quality of the uplink.

The inter-base station communication unit 18 transmits, to the adjacent base station device 10-2, uplink communication quality information with respect to the uplink measured by the uplink communication quality measuring unit 20. The adjacent cell communication quality acquiring unit 19 receives the uplink communication quality information, which is measured in the same way as in the adjacent base station device 10-2, with respect to the uplink between the adjacent base station device 10-2 and the communication device 50.

The tilt angle control unit 15 decides the adjustment amount of the tilt angle of the reception antenna 12 to decrease the difference between the communication quality of the uplink between the communication device 50 and the base station device 10-1 and the communication quality of the uplink between the communication device 50 and the adjacent base station device 10-2. The tilt angle changing unit 14 mechanically or electrically changes the tilt angle of the reception antenna 12 based on the adjustment amount decided by the tilt angle control unit 15. The configuration of the tilt angle control unit 15 may be substantially the same as the configuration described above with reference to FIG. 6.

Figure 12:
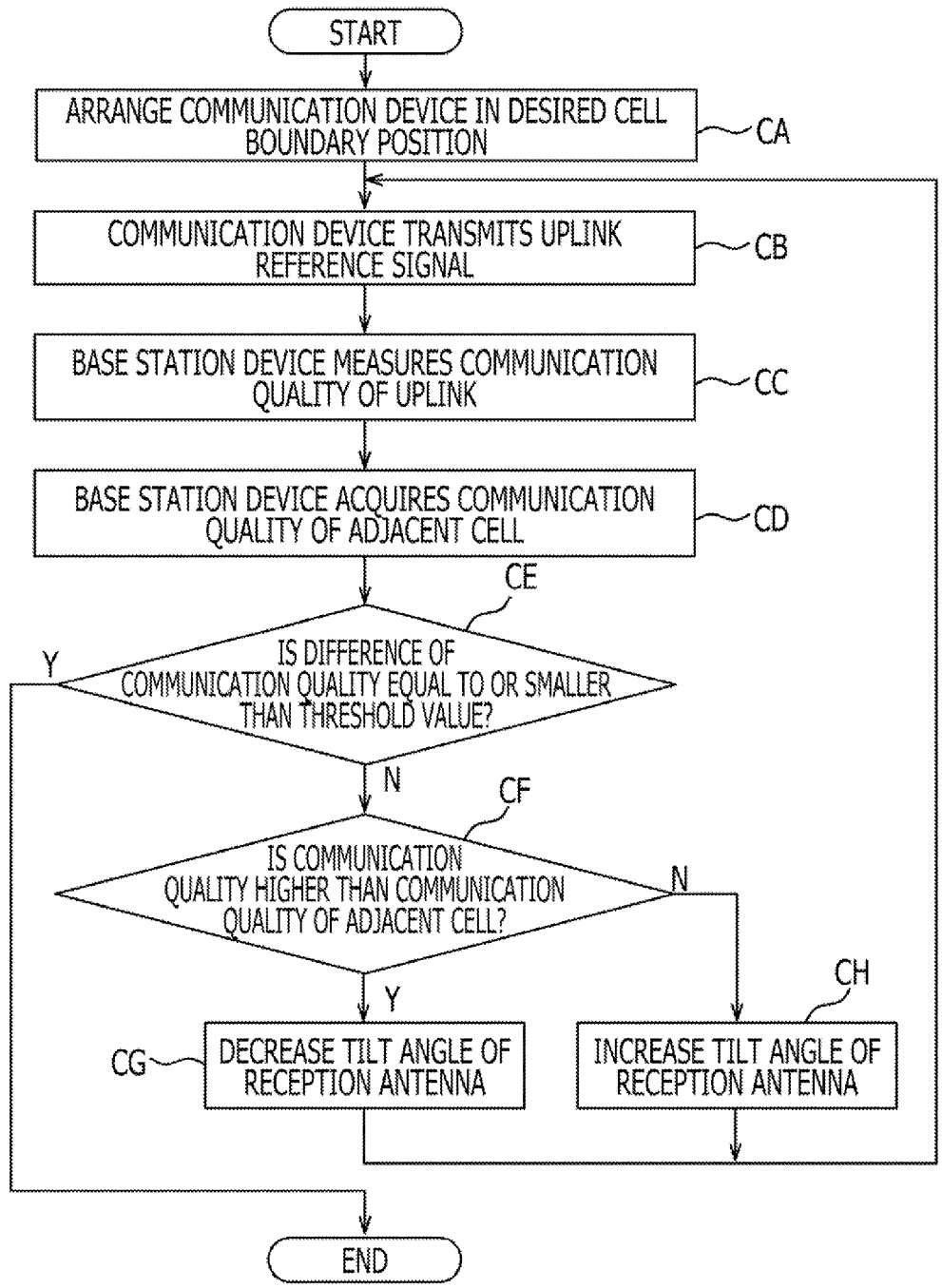
FIG. 12 is an explanation diagram of a control example of a tilt angle of a reception antenna in a radio communication system illustrated in FIG. 9.

FIG. 12 is an explanation diagram of a control example of a tilt angle of a reception antenna in the radio communication system illustrated in FIG. 9. In Operation CA, an operator, who adjusts the tilt angle of the reception antenna 12, arranges the communication device 50 in the desired cell boundary position.

In Operation CB, the uplink reference signal transmission unit 55 of the communication device 50 transmits the uplink reference signal. In Operation CC, each of the uplink communication quality measuring units 20 of the base station device 10-1 and of the adjacent base station device 10-2 measures the communication quality between the base station device 10-1 and the communication device 50 and between the adjacent base station device 10-2 and the communication device 50.

In Operation CD, the inter-base station communication unit 18 transmits the uplink communication quality information to the adjacent base station device 10-2. The adjacent cell communication quality acquiring unit 19 receives the uplink communication quality information, which is measured by the adjacent base station device 10-2, with respect to the uplink between the adjacent base station device 10-2 and the communication device 50.

In Operation CE, the tilt angle control unit 15 of the base station device 10-1 determines whether or not if the difference of the communication quality of the uplinks between the base station device 10-1 and the communication device 50 and between the adjacent base station device 10-2 and the communication device 50 is smaller than or equal to a threshold value T2. If the difference of the communication quality is smaller than or equal to the threshold value T2 (Y in Operation CE), the processing ends. If the difference of the communication quality is not smaller than or equal to the threshold value T2 (N in Operation CE), the process goes to Operation CF.

In Operation CF, the tilt angle control unit 15 determines whether or not if the communication quality between the base station device 10-1 and the communication device 50 is higher than the communication quality between the adjacent base station device 10-2 and the communication device 50. If the communication quality between the base station device 10-1 and the communication device 50 is higher than the communication quality between the adjacent base station device 10-2 and the communication device 50 (Y in Operation CF), the process goes to Operation CG. If the communication quality between the base station device 10-1 and the communication device 50 is not higher than the communication quality between the adjacent base station device 10-2 and the communication device 50 (N in Operation CF), the process goes to Operation CH.

In Operation CG, the adjustment amount deciding unit 32 decides the adjustment amount to increase the tilt angle of the reception antenna 12. In Operation CH, the adjustment amount deciding unit 32 decides the adjustment amount to decrease the tilt angle of the reception antenna 12. The tilt angle changing unit 14 changes the tilt angle of the reception antenna 12 based on the decided adjustment amount. After Operation CG or Operation CH, the process goes back to Operation CB. Operations CB to CH are repeated until the difference of the communication quality reaches or becomes smaller than the threshold value T2 in the determination in Operation CE.

According to the present embodiment, the tilt angle of the reception antenna 12 may be adjusted in that the cell boundary of the uplink is positioned in the desired target position. Therefore, according to the present embodiment, the position of the cell boundary of the uplink may be controlled when the difference of the cell boundary of the uplink and the cell boundary of the downlink between the adjacent cells may be eliminated or decreased.

Figure 13:
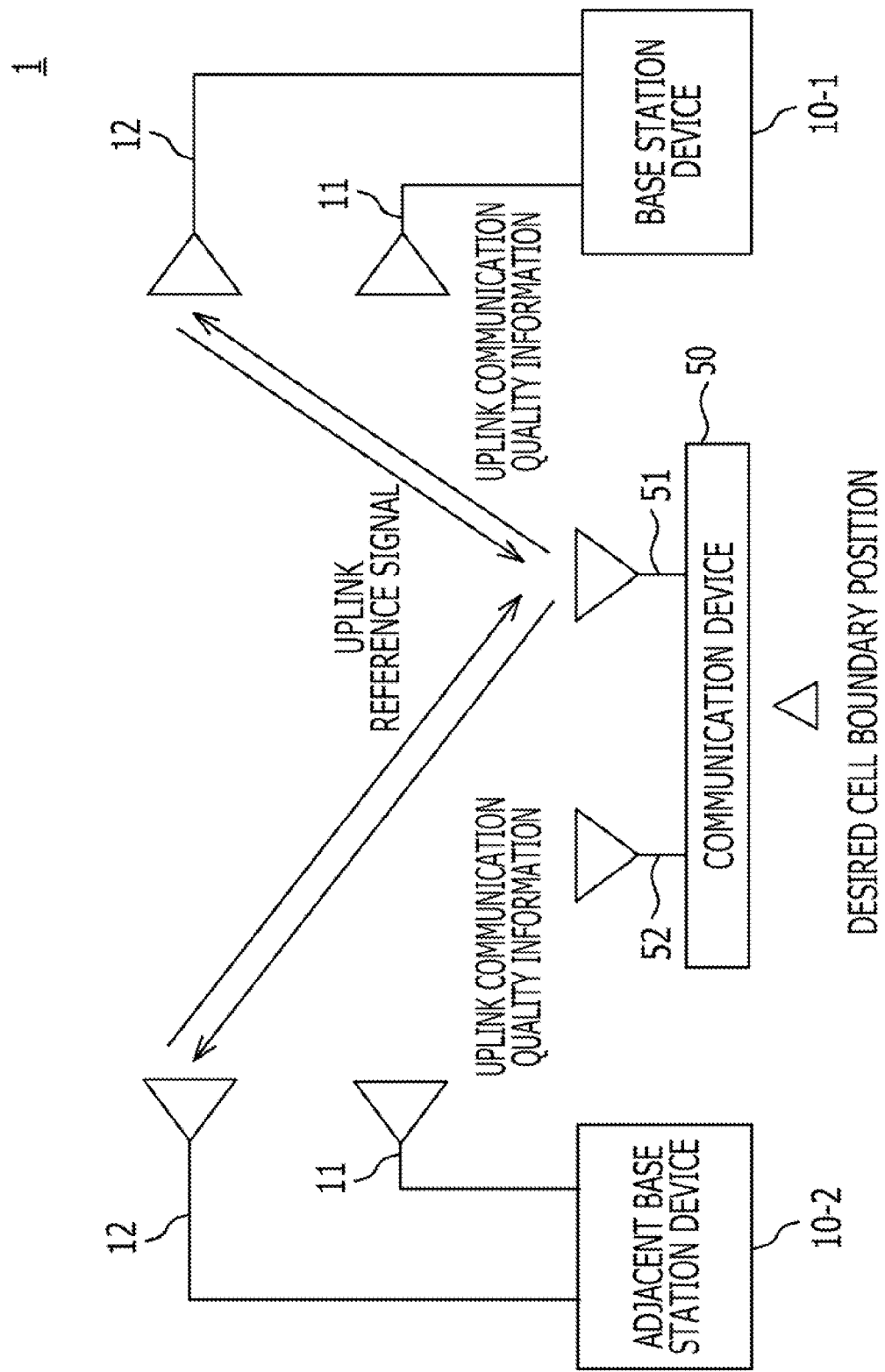
FIG. 13 is a configuration diagram of a third embodiment of the radio communication system.

Next, description will be made of other embodiments for adjusting the tilt angle of the reception antenna 12 of the base station device 10-1 by using the communication device 50 positioned in the above-described desired target position. Description will be made of other embodiments of the radio communication system. FIG. 13 is a configuration diagram of a third embodiment of the radio communication system. The base station device 10-1 according to the present embodiment may include the configuration illustrated in FIG. 4 to adjust the tilt angle of the transmission antenna 11. Similarly, the communication device 50 according to the present embodiment may include the configuration illustrated in FIG. 5 to adjust the tilt angle of the transmission antenna 11 of the base station device 10-1.

In the present embodiment, the base station device 10-1 and the adjacent base station device 10-2 transmit, from each of the reception antennas 12 thereof, the uplink reference signal for communication quality measurement in the uplink. The communication device 50 measures the communication quality of each of the uplinks between the base station device 10-1 and the communication device 50 and between the adjacent base station device 10-2 and the communication device 50 by receiving each of the uplink reference signals from the base station device 10-1 and the adjacent base station device 10-2 in the above-described desired target position.

Figure 14:
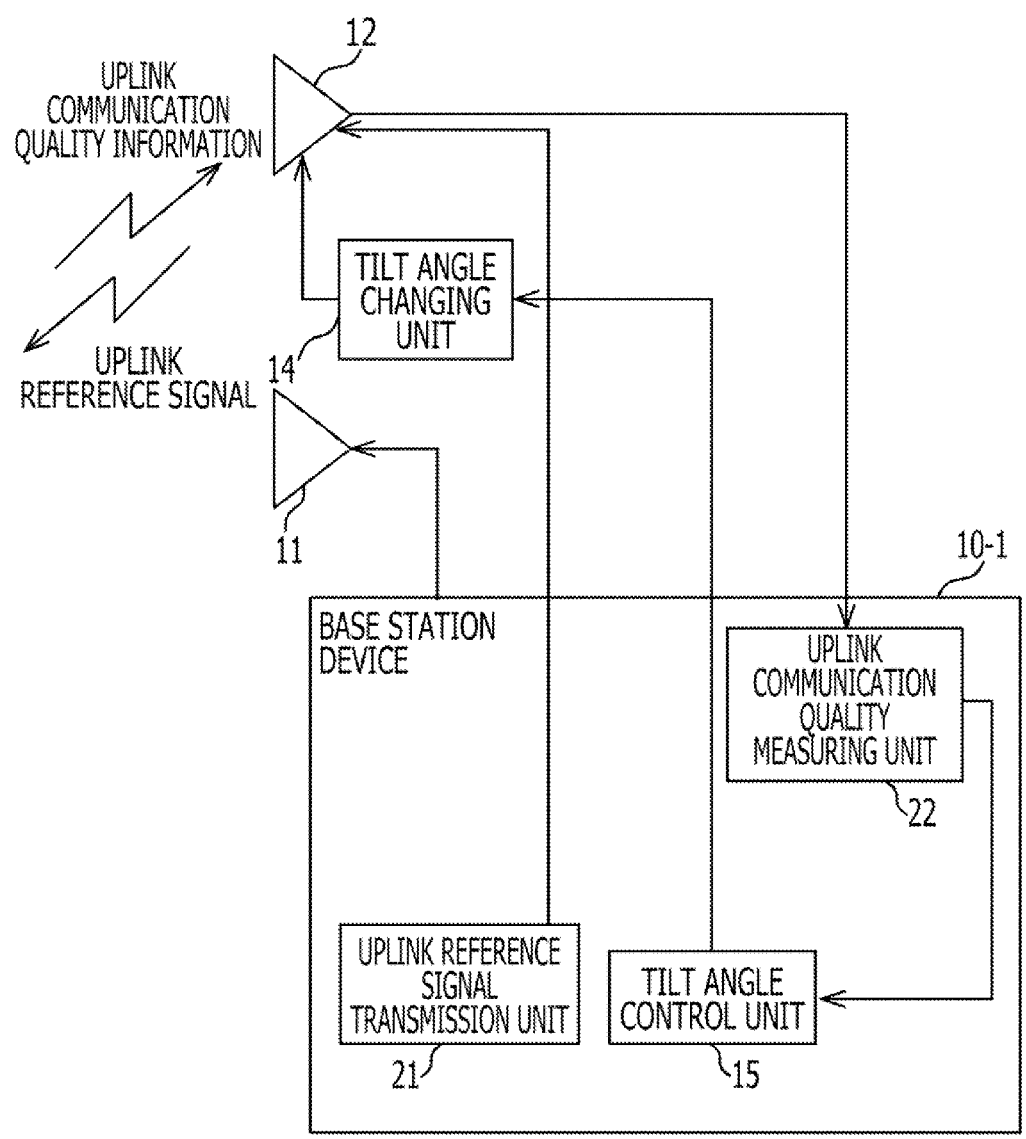
FIG. 14 is a diagram illustrating a configuration example of a base station device illustrated in FIG. 13.

FIG. 14 is a diagram illustrating a configuration example of the base station device 10-1 illustrated in FIG. 13. Reference numeral 21 indicates an uplink reference signal transmission unit. Reference numeral 22 indicates an uplink communication quality acquiring unit. The same components as in FIG. 11 have the same reference numerals that are used in FIG. 11. The base station device 10-1 includes the transmission antenna 11, the reception antenna 12, the tilt angle changing unit 14, the tilt angle control unit 15, the uplink reference signal transmission unit 21, and the uplink communication quality acquiring unit 22.

The uplink reference signal transmission unit 21 transmits the uplink reference signal through the reception antenna 12. As described below, the uplink reference signal is used when the communication device 50 measures the communication quality of the uplink between the base station device 10-1 and the communication device 50. When the downlink reference signal is transmitted from the transmission antenna 11 of the base station device 10-1 separately, the uplink reference signal may be transmitted in a time slot or a time frame that is different from the time slot or the time frame of the downlink reference signal or may be a signal orthogonal in frequency or code.

The uplink communication quality acquiring unit 22 receives the uplink communication quality information, which is transmitted from the communication device 50 and indicates the communication quality of the uplink between the base station device 10-1 and the communication device 50. Moreover, the uplink communication quality acquiring unit 22 receives the uplink communication quality information with respect to the uplink between the adjacent base station device 10-2 and the communication device 50.

Figure 15:
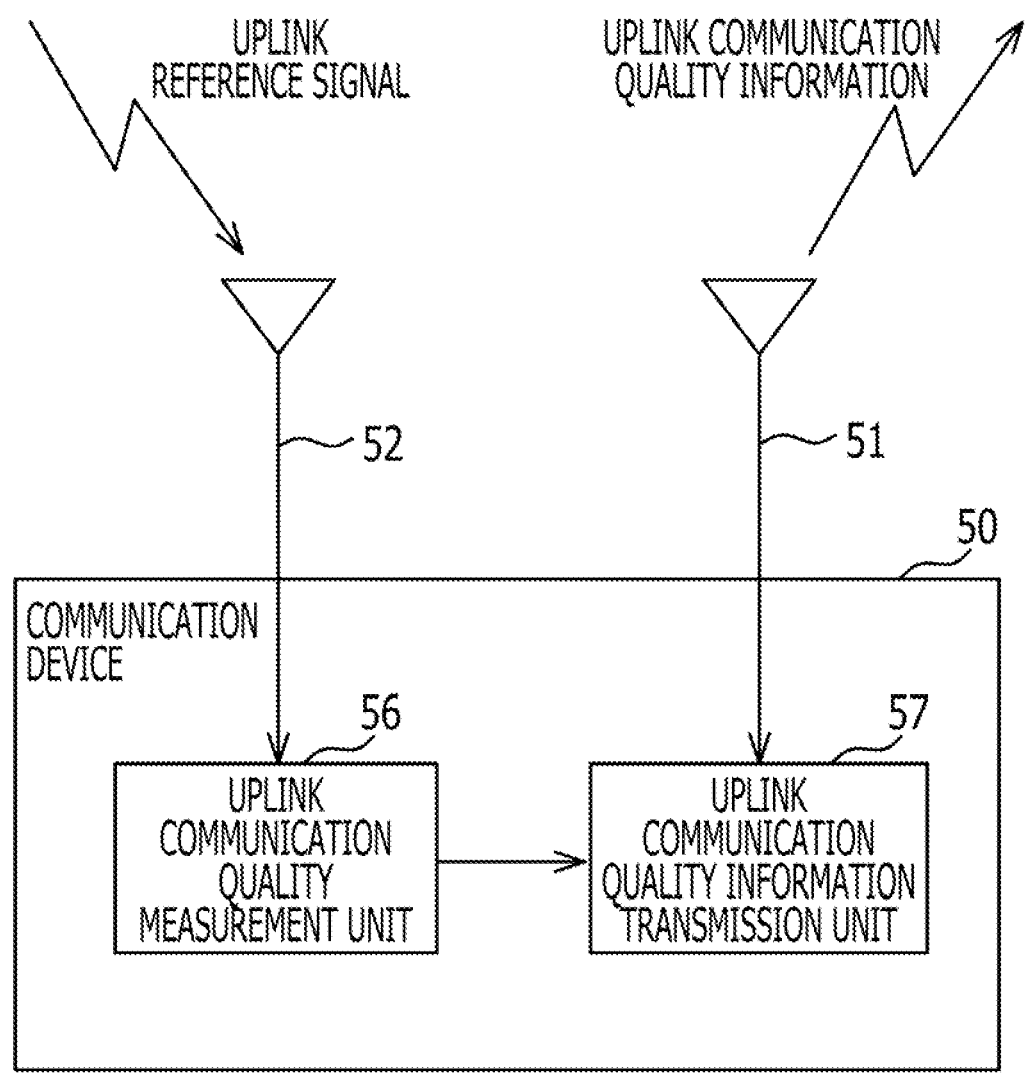
FIG. 15 is a diagram illustrating a configuration example of a communication device illustrated in FIG. 13.

FIG. 15 is a diagram illustrating a configuration example of the communication device 50 illustrated in FIG. 13. Reference numeral 56 indicates an uplink communication quality measuring unit. Reference numeral 57 indicates an uplink communication quality information transmission unit. The same components as in FIG. 5 have the same reference numerals that are used in FIG. 5. The communication device 50 includes the transmission antenna 51, the reception antenna 52, the uplink communication quality measuring unit 56, and the uplink communication quality information transmission unit 57.

The uplink communication quality measuring unit 56 measures the communication quality of the uplink between the base station device 10-1 and the communication device 50 and measures the communication quality of the uplink between the adjacent base station device 10-2 and the communication device 50. For example, the uplink communication quality measuring unit 56 calculates transmission loss by subtracting the reception power of the uplink reference signal, which is received from each of the base station device 10-1 and the adjacent base station device 10-2, from the previously reported transmission power of each of the base station device 10-1 and the adjacent base station device 10-2. The uplink communication quality measuring unit 56 may measure the communication quality of each of the downlinks based on each of the transmission loss.

The uplink communication quality information transmission unit 57 transmits, to the base station device 10-1, the uplink communication quality information between the base station device 10-1 and the communication device 50. The uplink communication quality information transmission unit 57 may transmit, to the base station device 10-1, the uplink communication quality information between the adjacent base station device 10-2 and the communication device 50.

Figure 16:
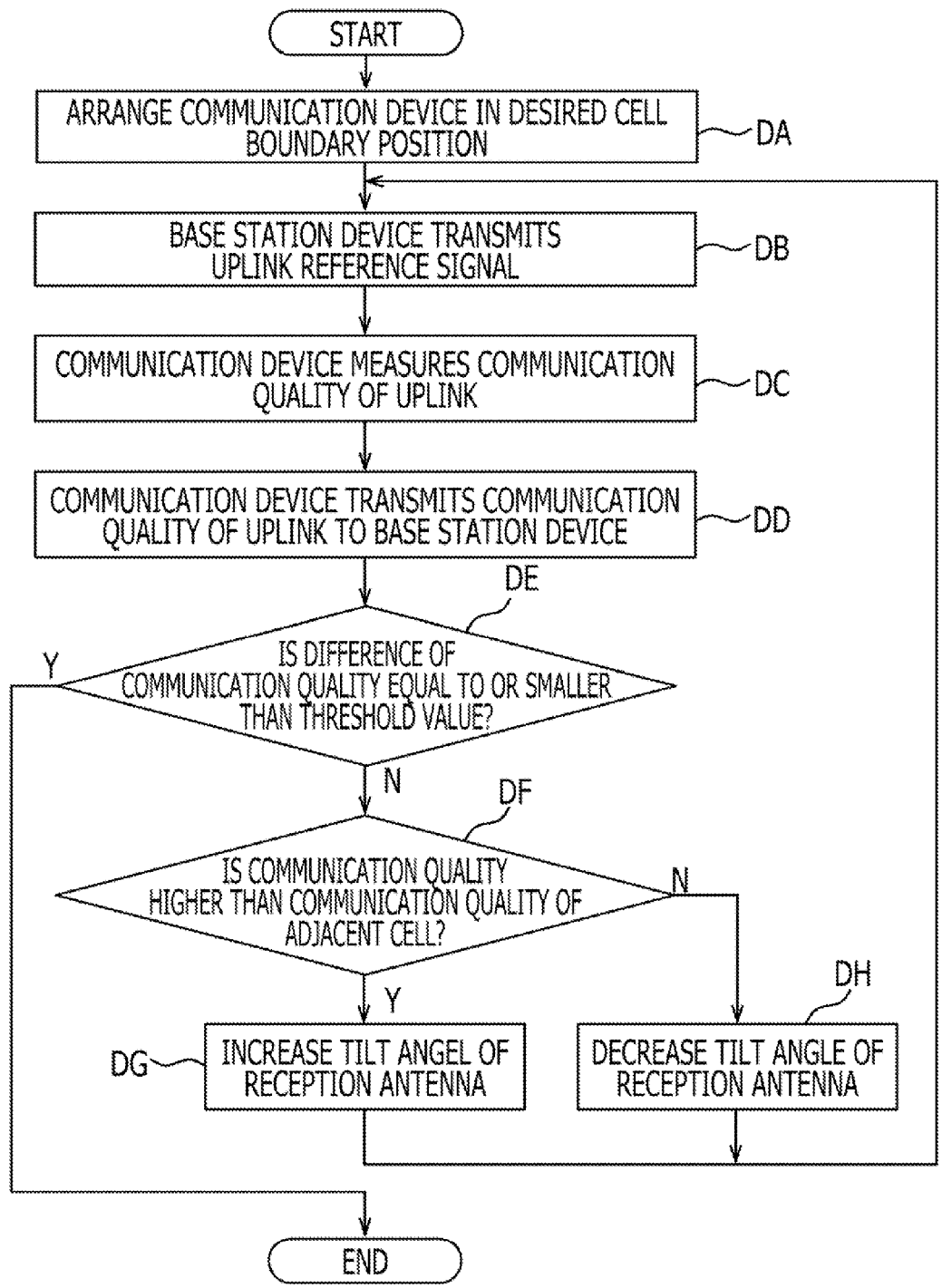
FIG. 16 is an explanation diagram of a control example of a tilt angle of a reception antenna in the radio communication system illustrated in FIG. 13.

FIG. 16 is an explanation diagram of a control example of a tilt angle of a reception antenna in the radio communication system illustrated in FIG. 13. In Operation DA, the operator, who adjusts the tilt angle of the reception antenna 12, arranges the communication device 50 in the desired cell boundary position.

In Operation DB, each of the uplink reference signal transmission units 21 of the base station device 10-1 and of the adjacent base station device 10-2 transmits the uplink reference signal. In Operation DC, the uplink communication quality measuring unit 56 of the communication device 50 measures the communication quality of the uplink between the base station device 10-1 and the communication device 50 and measures the communication quality of the uplink between the adjacent base station device 10-2 and the communication device 50.

In Operation DD, the downlink communication quality information transmission unit 54 transmits, to the base station device 10-1, the uplink communication quality information with respect to each of the uplinks between the base station device 10-1 and the communication device 50 and between the adjacent base station device 10-2 and the communication device 50.

In Operation DE, the tilt angle control unit 15 of the base station device 10-1 determines whether or not if the difference of the communication quality of the uplinks between the base station device 10-1 and the communication device 50 and between the adjacent base station device 10-2 and the communication device 50 is smaller than or equal to the threshold value T2. If the difference of the communication quality is smaller than or equal to the threshold value T2 (Y in Operation DE), the processing ends. If the difference of the communication quality is not smaller than or equal to the threshold value T2 (N in Operation DE), the process goes to Operation DF.

In Operation DF, the tilt angle control unit 15 determines whether or not the communication quality between the base station device 10-1 and the communication device 50 is higher than the communication quality between the adjacent base station device 10-2 and the communication device 50. If the communication quality between the base station device 10-1 and the communication device 50 is higher than the communication quality between the adjacent base station device 10-2 and the communication device 50 (Y in Operation DF), the process goes to Operation DG. If the communication quality between the base station device 10-1 and the communication device 50 is not higher than the communication quality between the adjacent base station device 10-2 and the communication device 50 (N in Operation DF), the process goes to Operation DH.

In Operation DG, the adjacent amount deciding unit 32 decides the adjustment amount to increase the tilt angle of the reception antenna 12. In Operation DH, the adjustment amount deciding unit 32 decides the adjustment amount to decrease the tilt angle of the reception antenna 12. The tilt angle changing unit 14 changes the tilt angle of the reception antenna 12 based on the decided adjustment amount. After Operation DG or Operation DH, the process goes back to Operation DB. Operations DB to DH are repeated until the difference of the communication quality reaches or becomes smaller than the threshold value T2 in the determination in Operation DE.

According to the present embodiment, the base station device 10-1 may acquire the uplink communication quality information between the base station device 10-1 and the adjacent base station device 10-2 and may adjust the tilt angle of the reception antenna 12.

In the embodiments described with reference to FIG. 13 to FIG. 16, the communication device 50 transmits, to the base station device 10-1, the uplink communication quality information with respect to both the uplinks between the base station device 10-1 and the communication device 50 and between the adjacent base station device 10-2 and the communication device 50. Instead, the communication device 50 may transmit the uplink communication quality information between the base station device 10-1 and the communication device 50 to the base station device 10-1 and may transmit the uplink communication quality information between the adjacent base station device 10-2 and the communication device 50 to the adjacent base station device 10-2. As with the embodiments described with reference to FIG. 8, the base station device 10-1 may acquire the downlink communication quality information between the adjacent base station device 10-2 and the communication device 50 through inter-base station communication between the base station device 10-1 and the adjacent base station device 10-2.

Figure 17:
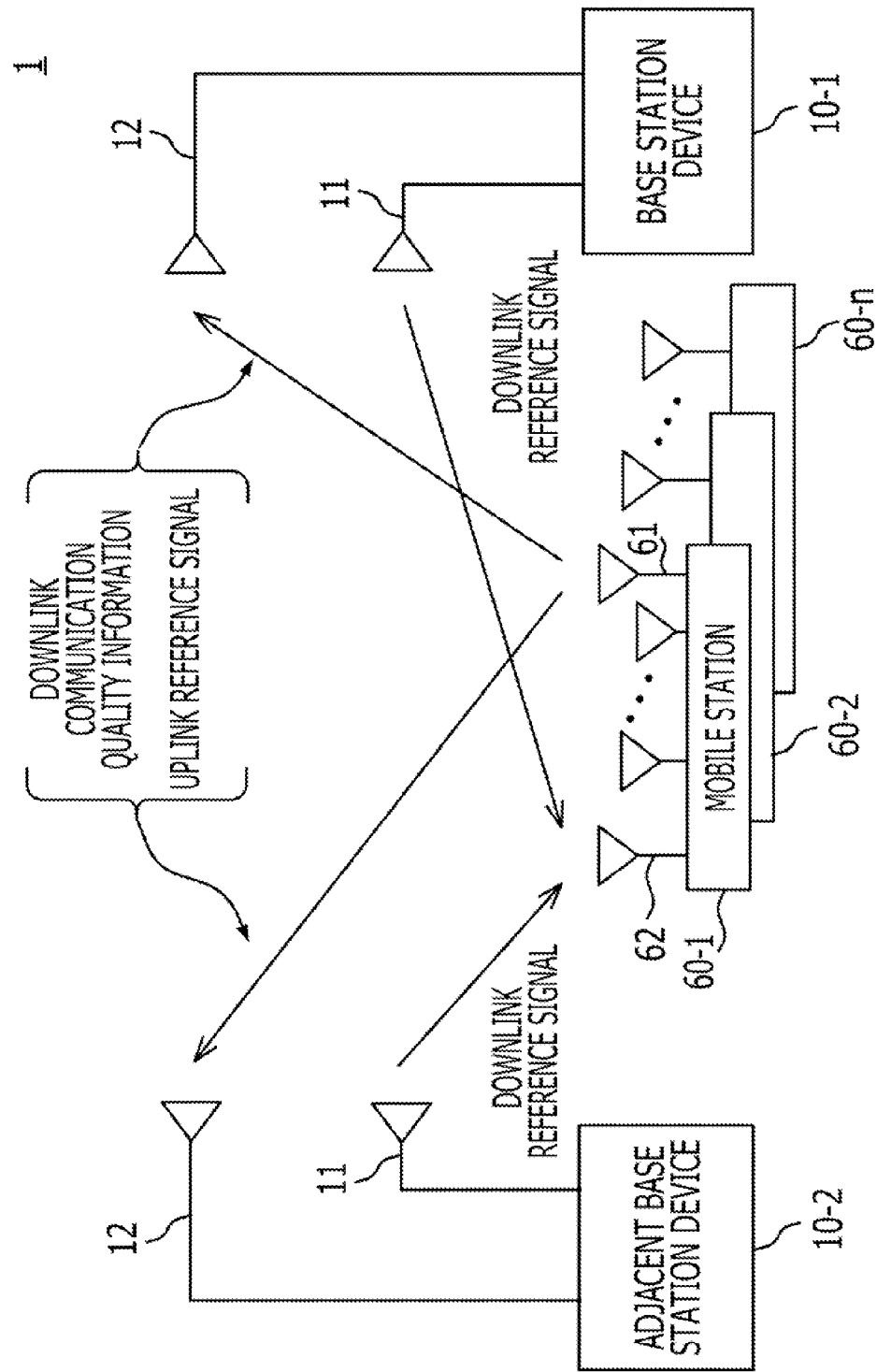
FIG. 17 is a configuration diagram of a fourth embodiment of a radio communication system.

Next, description will be made of other embodiments of the radio communication system. FIG. 17 is a configuration diagram of a fourth embodiment of the radio communication system. Each of reference numerals 60-1 and 60-2 to 60-$n$ is a mobile station that performs communication with the base station device 10-1 or the adjacent base station device 10-2. The mobile stations 60-1 and 60-2 to 60-$n$ may be collectively referred to as a mobile station 60. Reference numeral 61 indicates a transmission antenna of the mobile station 60. Reference numeral 62 indicates a reception antenna of the mobile station 60. A radio communication system 1 includes the base station device 10-1, the adjacent base station device 10-2, and the mobile stations 60-1 and 60-2 to 60-$n$.

Each of the base station device 10-1 and the adjacent base station device 10-2 transmits the downlink reference signal to the mobile station 60. Based on the reception quality of the received downlink reference signal, the mobile station 60 determines the cell in which the base station device whose reception quality of the downlink is the highest is arranged as a downlink communication cell. The mobile station 60 transmits downlink communication cell information, which indicates the determined downlink communication cell, to the base station device 10-1 that is arranged in the determined downlink communication cell.

The mobile station 60 transmits the uplink reference signal. By receiving the uplink reference signal transmitted from the mobile station 60, the base station device 10-1 measures the communication quality of the uplink between the base station device 10-1 and the mobile station 60. In substantially the same manner, the adjacent base station device 10-2 measures the communication quality of the uplink between the adjacent base station device 10-2 and the mobile station 60.

Figure 18:
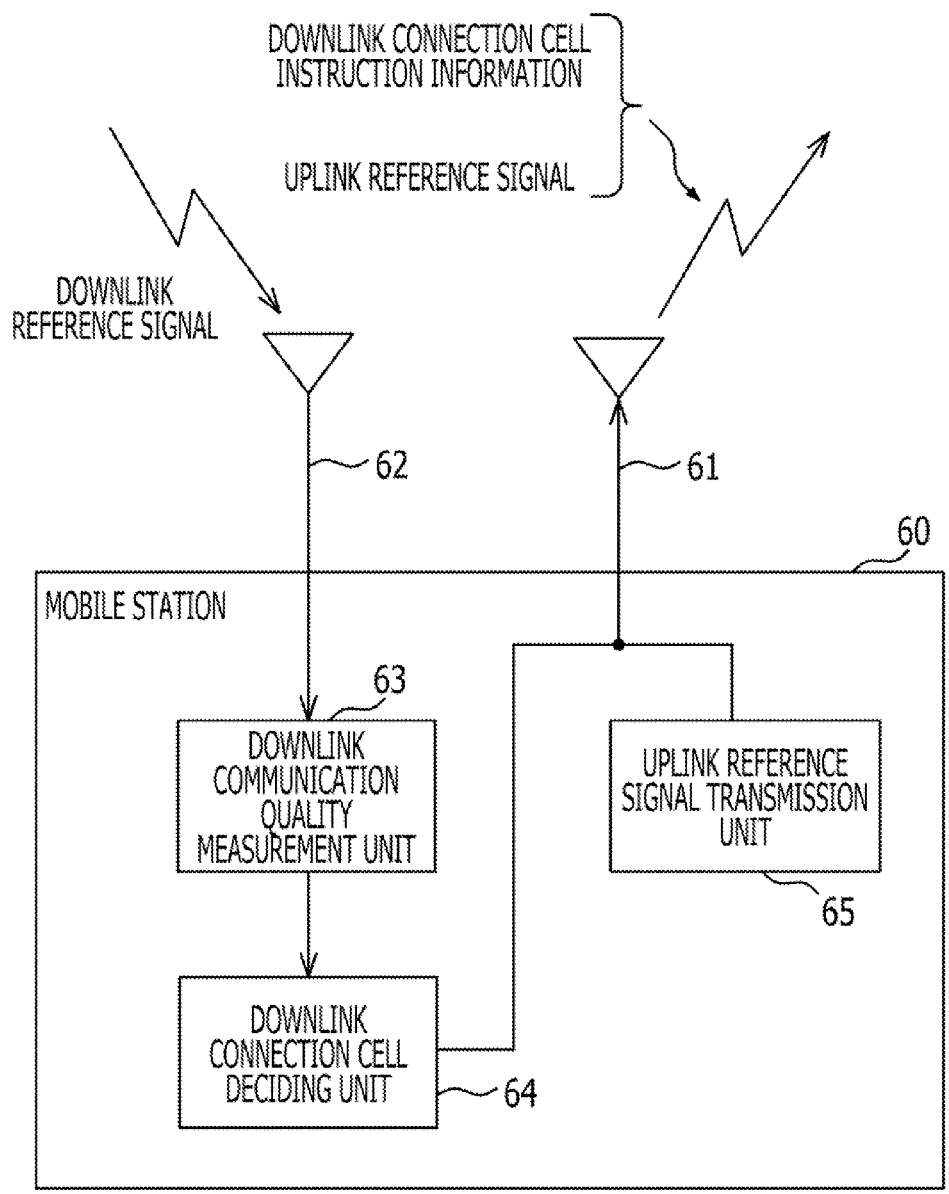
FIG. 18 is a diagram illustrating a configuration example of a mobile station illustrated in FIG. 17.

FIG. 18 is a diagram illustrating a configuration example of the mobile station 60 illustrated in FIG. 17. Reference numeral 63 indicates a downlink communication quality measuring unit. Reference numeral 64 indicates a downlink communication cell deciding unit. Reference numeral 65 indicates an uplink reference signal transmission unit. The mobile station 60 includes the transmission antenna 61, the reception antenna 62, the downlink communication quality measuring unit 63, the downlink communication cell deciding unit 64, and the uplink reference signal transmission unit 65.

Based on the downlink reference signal received from each of the base station device 10-1 and other base station devices including the adjacent base station device 10-2, the downlink communication quality measuring unit 63 measures the reception quality of each of the downlinks between each of the base station devices and the mobile station 60. For example, the downlink communication quality measuring unit 63 may measure the reception power of the reference signal, which is transmitted from each of the base station devices, as the reception quality of each of the downlinks thereof.

Based on the reception quality of the downlink, the downlink communication cell deciding unit 64 decides the cell in which the base station device whose reception quality of the downlink is the highest is arranged as a downlink communication cell. The downlink communication cell deciding unit 64 transmits the downlink communication cell information, which indicates the decided downlink communication cell, to the base station device that is arranged in the decided downlink communication cell. The downlink communication cell information may include, for example, an identifier of the mobile station 60 and the identifier of the downlink communication cell.

The uplink reference signal transmission unit 65 transmits the uplink reference signal through the transmission antenna 61. The uplink reference signal is used when the base station device 10-1 and the other base station devices including the adjacent base station device 10-2 measure the communication quality of the uplink between each of the base station devices and the mobile station 60. The uplink reference signal is transmitted in a form in association with identifier information of the mobile station 60 transmitted from the mobile station 60. For example, the uplink reference signal may include the identifier of the mobile station 60 or may indicate the identifier of the mobile station 60. Moreover, for example, the uplink reference signal may be associated with the identifier of the mobile station 60 by being transmitted, from the mobile station 60, in substantially the same time slot or substantially the same data frame as of the identifier of the mobile station 60.

Figure 19:
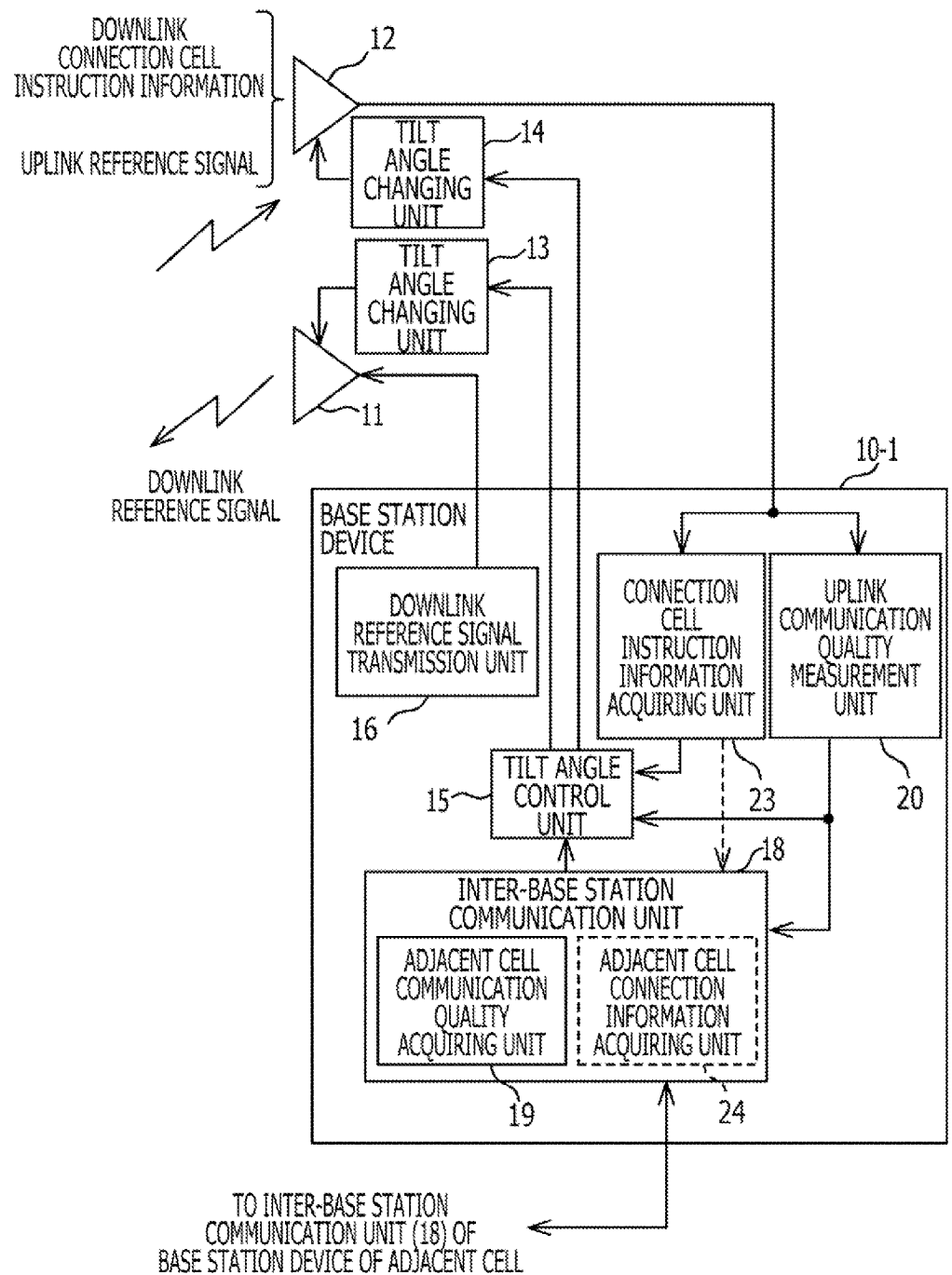
FIG. 19 is a diagram illustrating a configuration example of a base station device illustrated in FIG. 17.

FIG. 19 is a diagram illustrating a configuration example of the base station device 10-1 illustrated in FIG. 17. Reference numeral 23 indicates a connection cell instruction information acquiring unit. Reference numeral 24 indicates an adjacent cell connection information acquiring unit. The same components as in FIG. 4 or FIG. 11 have the same reference numerals that are used in FIG. 4 or FIG. 11. The base station device 10-1 includes the transmission antenna 11, the reception antenna 12, the tilt angle changing units 13 and 14, the tilt angle control unit 15, the downlink reference signal transmission unit 16, the inter-base station communication unit 18, the uplink communication quality measuring unit 20, and the connection cell instruction information acquiring unit 23. The inter-base station communication unit 18 includes the adjacent cell communication quality acquiring unit 19 and the adjacent cell connection information acquiring unit 24.

The downlink reference signal transmission unit 16 transmits the downlink reference signal through the transmission antenna 11. The downlink reference signal is used when the mobile station 60 measures the reception quality of the downlink between the base station device 10-1 and the mobile station 60. The connection cell instruction information acquiring unit 23 receives, through the reception antenna 12, the downlink communication cell instruction information that is transmitted from the mobile station 60.

The inter-base station communication unit 18 transmits, to the adjacent base station device 10-2, the downlink communication cell instruction information acquired by the connection cell instruction information acquiring unit 23.

The adjacent cell connection information acquiring unit 24 receives the downlink connection instruction information that is acquired by the connection cell instruction information acquiring unit 23 of the adjacent base station device 10-2 and is then transmitted from the adjacent base station device 10-2. The downlink communication cell instruction information acquired by the connection cell instruction information acquiring unit 23 and the downlink communication cell indication information acquired by the adjacent cell connection information acquiring unit 24 are output to the tilt angle control unit 15.

The uplink communication quality measuring unit 20 measures the communication quality of the uplink between the base station device 10-1 and the mobile station 60. For example, the uplink communication quality measuring unit 20 may measure the reception power of the uplink reference signal, which is transmitted from the mobile station 60, as the communication quality of the uplink. The uplink communication quality measuring unit 20 generates uplink communication quality information indicating the measured communication quality of the uplink. The uplink communication quality information may include the communication quality of the uplink, the identifier of the cell in which the base station device 10-1 is arranged, and the identifier of the mobile station 60.

The inter-base station communication unit 18 transmits, to the adjacent base station device 10-2, the uplink communication quality information generated by the uplink communication quality measuring unit 20.

The adjacent cell communication quality acquiring unit 19 receives the uplink communication quality information that is generated by the uplink communication quality measuring unit 20 of the adjacent base station device 10-2 and is then transmitted from the adjacent base station device 10-2. The uplink communication quality information generated by the uplink communication quality measuring unit 20 and the uplink communication quality information acquired by the adjacent cell communication quality acquiring unit 19 are output to the tilt angle control unit 15.

Figure 20:
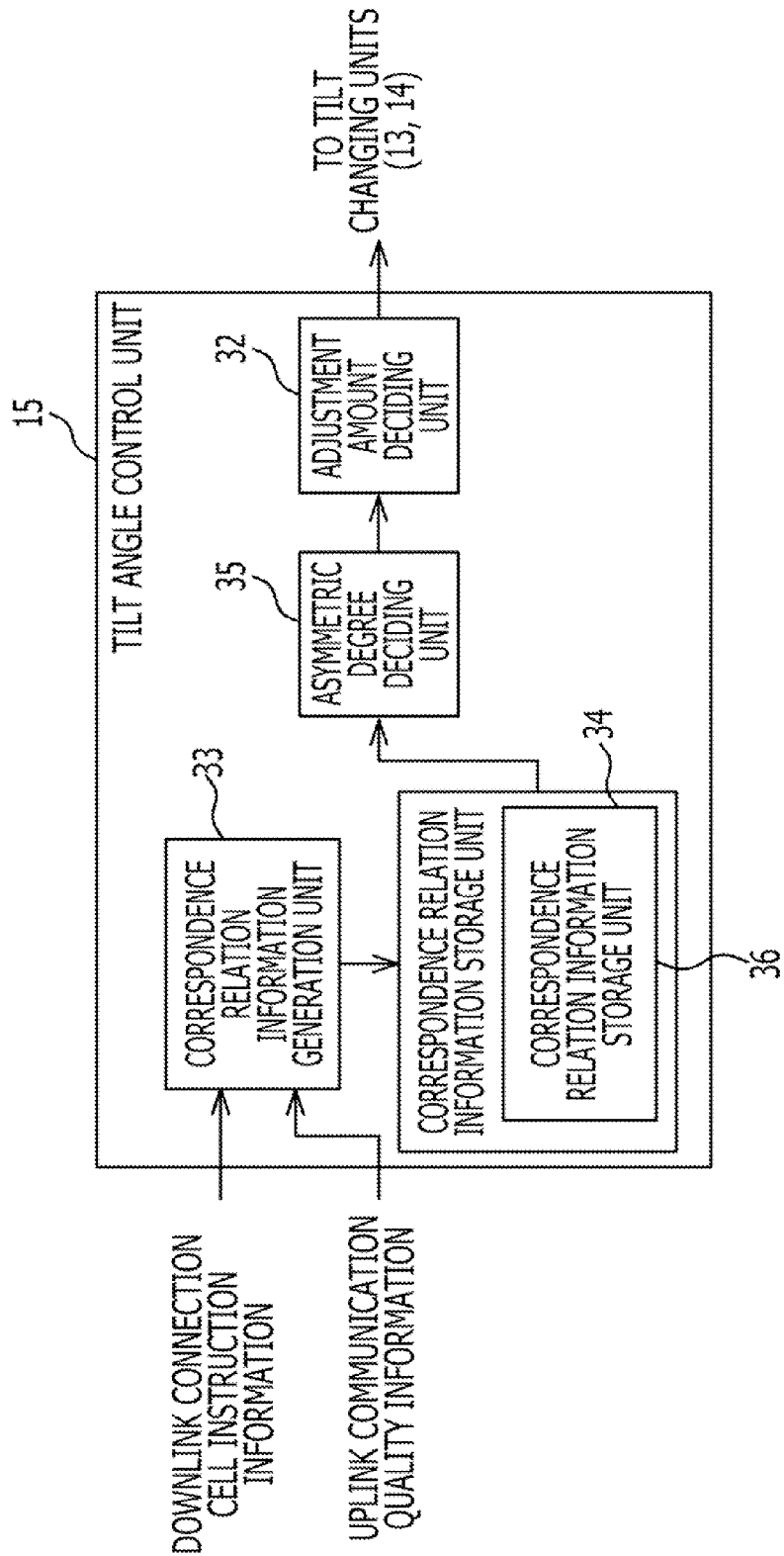
FIG. 20 is a diagram illustrating a configuration example of a tilt angle control unit illustrated in FIG. 19.

FIG. 20 is a diagram illustrating a configuration example of the tilt angle control unit 15 illustrated in FIG. 19. Reference numeral 32 indicates an adjustment amount deciding unit. Reference numeral 33 indicates a correspondence relation information generation unit. Reference numeral 34 indicates a correspondence relation information storage unit. Reference numeral 35 indicates an asymmetric degree deciding unit. The correspondence relation information generation unit 33 generates a correspondence relation information 36 based on the downlink communication cell information and the downlink communication quality information that are input to the tilt angle control unit 15. The correspondence relation information 36 is stored in the correspondence relation information storage unit 34.

The correspondence relation information 36 indicates a correspondence relation between each mobile station 60 and the cell decided as a downlink communication cell in the mobile station 60. In this case, the downlink communication cell is a cell in which the base station device whose reception quality of the downlink reference signal is the highest is located.

Therefore, the correspondence relation information 36 indicates a correspondence relation between each mobile station 60 and the base station device whose communication quality of the downlink between each mobile station 60 and the cell in which the base station device is located is measured to be the highest with respect to the mobile station 60. Furthermore, the correspondence relation information 36 indicates the correspondence relation between each mobile station 60 and the cell in which the base station device whose communication quality of the uplink between each mobile station 60 and the cell in which the base station device is located is measured to be the highest.

FIG. 21 is an explanation diagram of a realization example of the correspondence relation information 36. The correspondence relation information 36 may be realized by, for example, a table structure illustrated in FIG. 21. The table illustrated in FIG. 21 has a column for storing the identifier of each mobile station 60, a column for storing the identifier of the downlink communication cell of the mobile station 60, and a column for storing the identifier of the cell of the base station device whose communication quality of the downlink between the mobile station 60 and the cell in which the base station device is measured to be the highest. For convenience of the description, the cell of the base station device whose communication quality of the uplink between the mobile station 60 and the cell thereof is measured to be the highest may be referred to as an "uplink highest quality cell."

If the uplink-and-downlink asymmetric state does not occur, the downlink communication cell of each mobile station 60 almost corresponds to the uplink highest quality cell. Accordingly, if the uplink-and-downlink asymmetric state does not occur, the number of the mobile stations 60 where the arrangement cell of the base station device 10-1 is the downlink communication cell is substantially the same as the number of the mobile stations 60 where the arrangement cell of the base station device 10-1 is the uplink highest quality cell.

The asymmetric degree deciding unit 35 illustrated in FIG. 20 calculates a difference, as an "asymmetric degree," between the number of the mobile stations 60 where the arrangement cell of the base station device 10-1 is the downlink communication cell and the number of the mobile stations 60 where the arrangement cell of the base station device 10-1 is the uplink highest quality cell. For example, the asymmetric degree deciding unit 35 may calculate the difference, as an asymmetric degree, between the number of the mobile stations 60 where the arrangement cell of the base station device 10-1 is the downlink communication cell and the number of the mobile stations 60 where the arrangement cell of the base station device 10-1 is the uplink highest quality cell. Furthermore, for example, the asymmetric degree deciding unit 35 may calculate a ratio, as an asymmetric degree, of the number of the mobile stations 60 where the arrangement cell of the base station device 10-1 is the downlink communication cell to the number of the mobile stations 60 where the arrangement cell of the base station device 10-1 is the downlink highest quality cell.

If the asymmetric degree is larger than a prescribed threshold value T3, the adjustment amount deciding unit 32 decides the adjustment amount to adjust at least either of the tilt angle of the transmission antenna 11 and the tilt angle of the reception antenna 12. If the number of the mobile stations where the arrangement cell of the base station device 10-1 is the downlink communication cell is larger than the number of the mobile stations where the arrangement cell of the base station device 10-1 is the uplink highest quality cell, the adjustment amount deciding unit 32 decides the adjustment amount to increase the tilt angle of the transmission antenna 11. Furthermore or instead, the adjustment amount deciding unit 32 decides the adjustment amount to decrease the tilt angle of the reception antenna 12.

If the number of the mobile stations where the arrangement cell of the base station device 10-1 is the downlink communication cell is smaller than the number of the mobile stations where the arrangement cell of the base station device 10-1 is the uplink highest quality cell, the adjustment amount deciding unit 32 decides the adjustment amount to decrease the tilt angle of the transmission antenna 11. Furthermore or instead, the adjustment amount deciding unit 32 decides the adjustment amount to increase the tilt angle of the reception antenna 12. The adjustment amount deciding unit 32 may decide the adjustment amount based on, for example, the table and calculation formula that are used to previously determine the relation between the asymmetric degree and the adjustment amount of the tilt angle. Furthermore, for example, the adjustment amount decided by the adjustment amount deciding unit 32 in one adjustment may be the adjustment amount of the fixed step angle Δθ.

Figure 22:
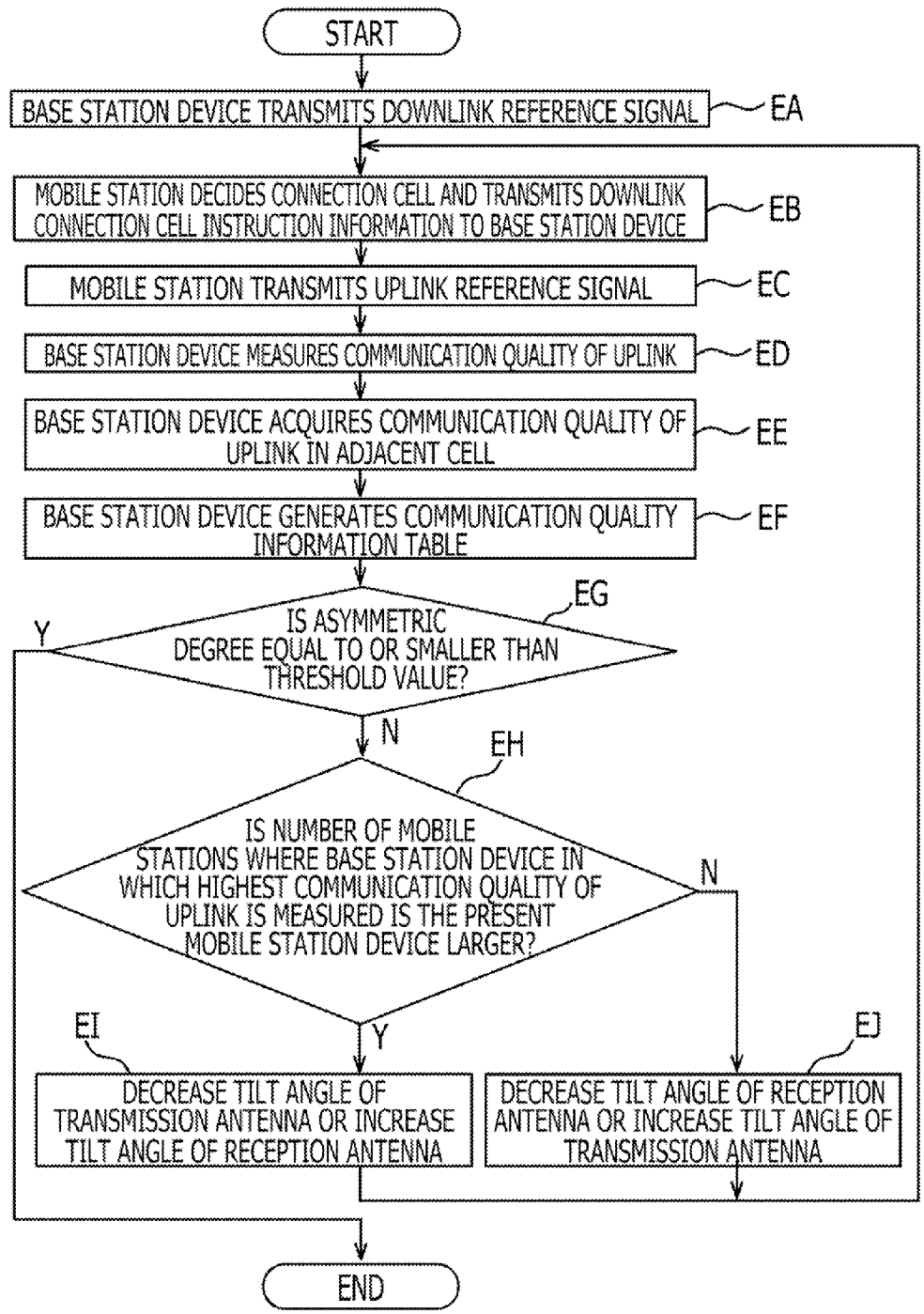
FIG. 22 is an explanation diagram of a control example of a tilt angle of an antenna in the radio communication system illustrated in FIG. 17.

FIG. 22 is an explanation diagram of a control example of the tilt angle of the antenna in the radio communication system illustrated in FIG. 17.

In Operation EA, the downlink reference signal transmission unit 16 of the base station device 10-1 and the other base station devices including the adjacent base station device 10-2 transmits the downlink reference signal. In Operation EB, the downlink communication quality measuring unit 63 of the mobile station 60 measures the reception quality of each of the downlinks between each of the base station devices and the mobile station 60. The downlink communication cell deciding unit 64 decides the downlink communication cell and transmits the downlink communication cell information to the base station device arranged in the downlink communication cell.

In Operation EC, the uplink reference signal transmission unit 65 of the mobile station 60 transmits the uplink reference signal. In Operation ED, the uplink communication quality measuring unit 20 of the base station device 10-1 and the other base stations including the adjacent base station device 10-2 measures the communication quality of each of the uplinks between each of the base station devices and the mobile station 60.

In Operation EE, the inter-base station communication unit 18 of the base station device 10-1 transmits, to the adjacent base station device 10-2, the uplink communication quality information generated by the uplink communication quality measuring unit 20. The inter-base station communication unit 18 of the base station device 10-1 transmits, to the adjacent base station device 10-2, the downlink communication cell instruction information acquired by the connection cell instruction information acquiring unit 23.

On the other hand, the adjacent cell communication quality acquiring unit 19 of the base station device 10-1 receives the uplink communication quality information transmitted from the adjacent base station device 10-2. The adjacent cell connection information acquiring unit 24 of the base station device 10-1 receives the downlink communication cell instruction information transmitted from the adjacent base station device 10-2. In Operation EF, the correspondence relation information generation unit 33 of the base station device 10-1 generates the correspondence relation information 36.

In Operation EG, the asymmetric degree deciding unit 35 of the base station device 10-1 calculates the above-described asymmetric degree. That is, the asymmetric degree deciding unit 35 calculates the difference between the number of the mobile stations 60 where the arrangement cell of the base station device 10-1 is the downlink communication cell and the number of the mobile stations 60 where the arrangement cell of the base station device 10-1 is the uplink highest quality cell. The adjustment amount deciding unit 32 determines whether the asymmetric degree is smaller than or equal to the prescribed threshold value T3. If the asymmetric degree is smaller than or equal to the threshold value T3 (Y in Operation EG), the processing ends. If the asymmetric degree is not smaller than or equal to the threshold value T3 (N in Operation EG), the process goes to Operation EH.

In Operation EH, the adjustment amount deciding unit 32 determines whether the number of the mobile stations 60 where the arrangement cell of the base station device 10-1 is the uplink highest quality cell is larger or smaller than the number of the mobile stations 60 where the arrangement cell of the base station device 10-1 is the downlink communication cell. If the number of the mobile stations 60 where the arrangement cell of the base station device 10-1 is the uplink highest quality cell is larger than the number of the mobile stations 60 where the arrangement cell of the base station device 10-1 is the downlink communication cell (Y in Operation EH), the process goes to Operation EI. If the number of the mobile stations 60 where the arrangement cell of the base station device 10-1 is the uplink highest quality cell is not larger than the number of the mobile stations 60 where the arrangement cell of the base station device 10-1 is the downlink communication cell (N in Operation EH), the process goes to Operation EJ.

In Operation EI, the adjustment amount deciding unit 32 decides the adjustment amount to decrease the tilt angle of the transmission antenna 11. Furthermore or instead, the adjustment amount deciding unit 32 decides the adjustment amount to increase the tilt angle of the reception antenna 12. In Operation EJ, the adjustment amount deciding unit 32 decides the adjustment amount to increase the tilt angle of the transmission antenna 11. Furthermore or instead, the adjustment amount deciding unit 32 decides the adjustment amount to decrease the tilt angle of the reception antenna 12. The tilt angle changing unit 13 changes the tilt angle of the transmission antenna 11 based on the decided adjustment amount. Furthermore or instead, the tilt angle changing unit 14 changes the tilt angle of the reception antenna 12 based on the decided adjustment amount. After Operation EI or Operation EJ, the process goes back to Operation EB. Operations EB to EJ are repeated until the asymmetric degree reaches or becomes smaller than the threshold value T3 in the determination in Operation EG.

According to the present embodiment, the base station device 10-1 may control the tilt angle of the transmission antenna 11 and the reception antenna 12 based on the downlink communication cell instruction information transmitted from the mobile station 60 and on the measured communication quality of the uplink between the base station device 10-1 and the mobile station 60.

In the embodiments described with reference to FIG. 17 to FIG. 22, each of the mobile stations 60 transmits the downlink communication cell instruction information to the base station device that is arranged in the downlink communication cell. Each of the base station devices transmits the transmitted downlink communication cell instruction information to the adjacent base station device by the inter-base station communication unit 18. Instead, each of the mobile stations 60 may transmit the downlink communication cell instruction information to each of the base station devices arranged in the downlink communication cell and the surrounding cells. In this case, since the base station device 10-1 may directly receive, from the mobile station 60, link connection cell instruction information indicating the cell of the adjacent base station device 10-2 as a downlink communication cell, the adjacent cell connection information acquiring unit 24 may be omitted.

As with the embodiments described with reference to FIG. 13 to FIG. 16, in the embodiments described with reference to FIG. 17 to FIG. 22, each of the base station devices may transmit, from each of the reception antennas 12, the uplink reference signal for the communication quality measurement in the uplink. By receiving the uplink reference signal from each of the base station devices, the mobile station 60 may measure the communication quality of each of the uplinks between each of the base station devices and the mobile station 60. Therefore, each of the base station devices may include the components illustrated in FIG. 14, and the mobile station 60 may include the components illustrated in FIG. 15.

Figure 23:
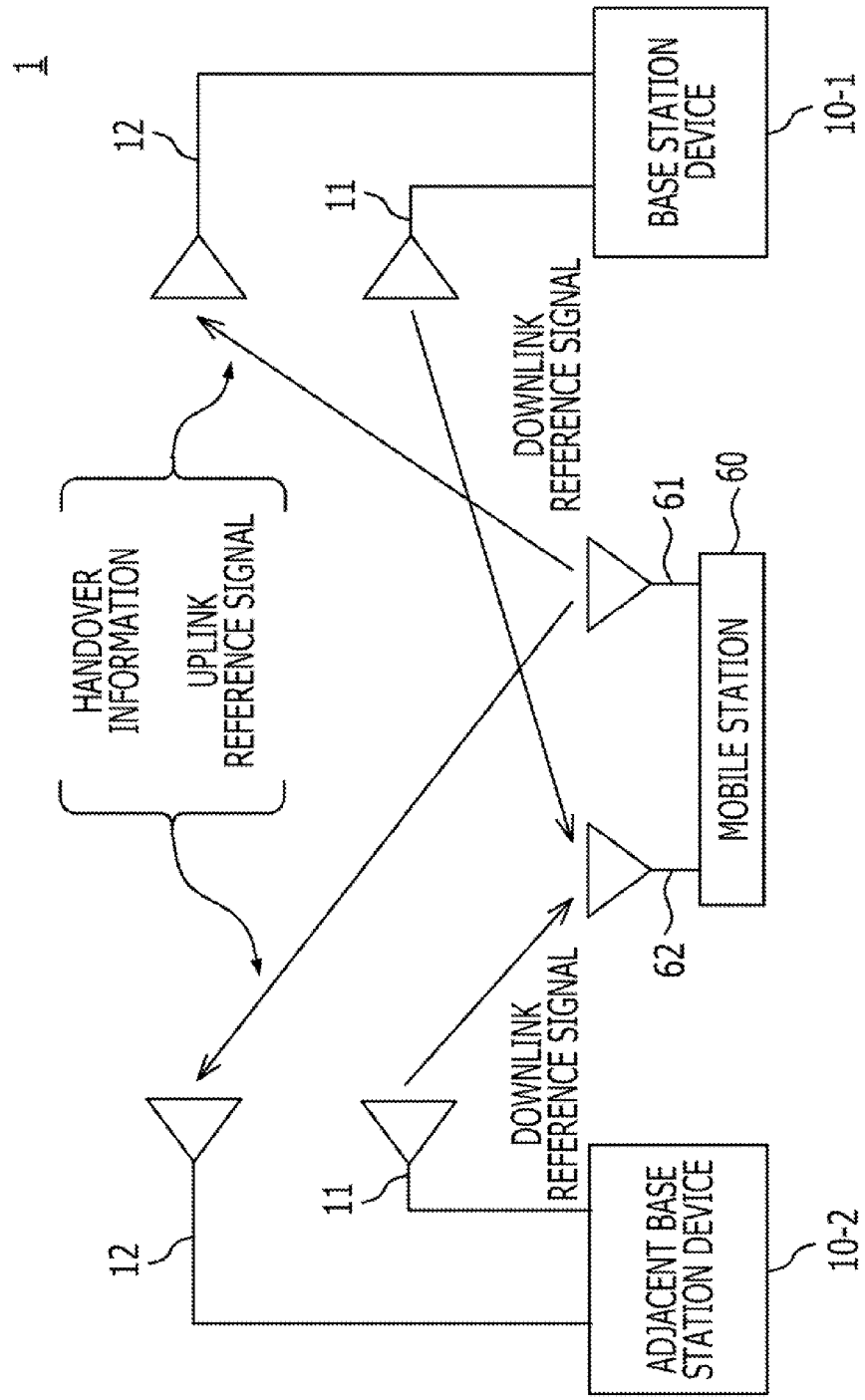
FIG. 23 is a configuration diagram of a fifth embodiment of the radio communication system.

Next, description will be made of other embodiments of the radio communication system. FIG. 23 is a configuration example of a fifth embodiment of the radio communication system. The radio communication system 1 includes the base station device 10-1, the adjacent base station device 10-2, and the plurality of mobile stations 60. Each of the base station device 10-1 and the adjacent base station device 10-2 transmits the downlink reference signal to the mobile station 60. Based on the reception quality of the received downlink reference signal, the mobile station 60 determines whether or not handover occurs in the cell boundary between the arrangement cell of the base station device 10-1 and the arrangement cell of the adjacent base station device 10-2.

If the handover occurs, the mobile station 60 reports handover information indicating that the handover occurred to a handover base station device 10-1 and the adjacent base station device 10-2. Moreover, the mobile station 60 transmits the uplink reference signal. By receiving the uplink reference signal, the base station device 10-1 measures a communication quality of the uplink between the base station device 10-1 and the mobile station 60. In substantially the same manner, the adjacent base station device 10-2 measures the communication quality of the uplink between the adjacent base station device 10-2 and the mobile station 60.

Figure 24:
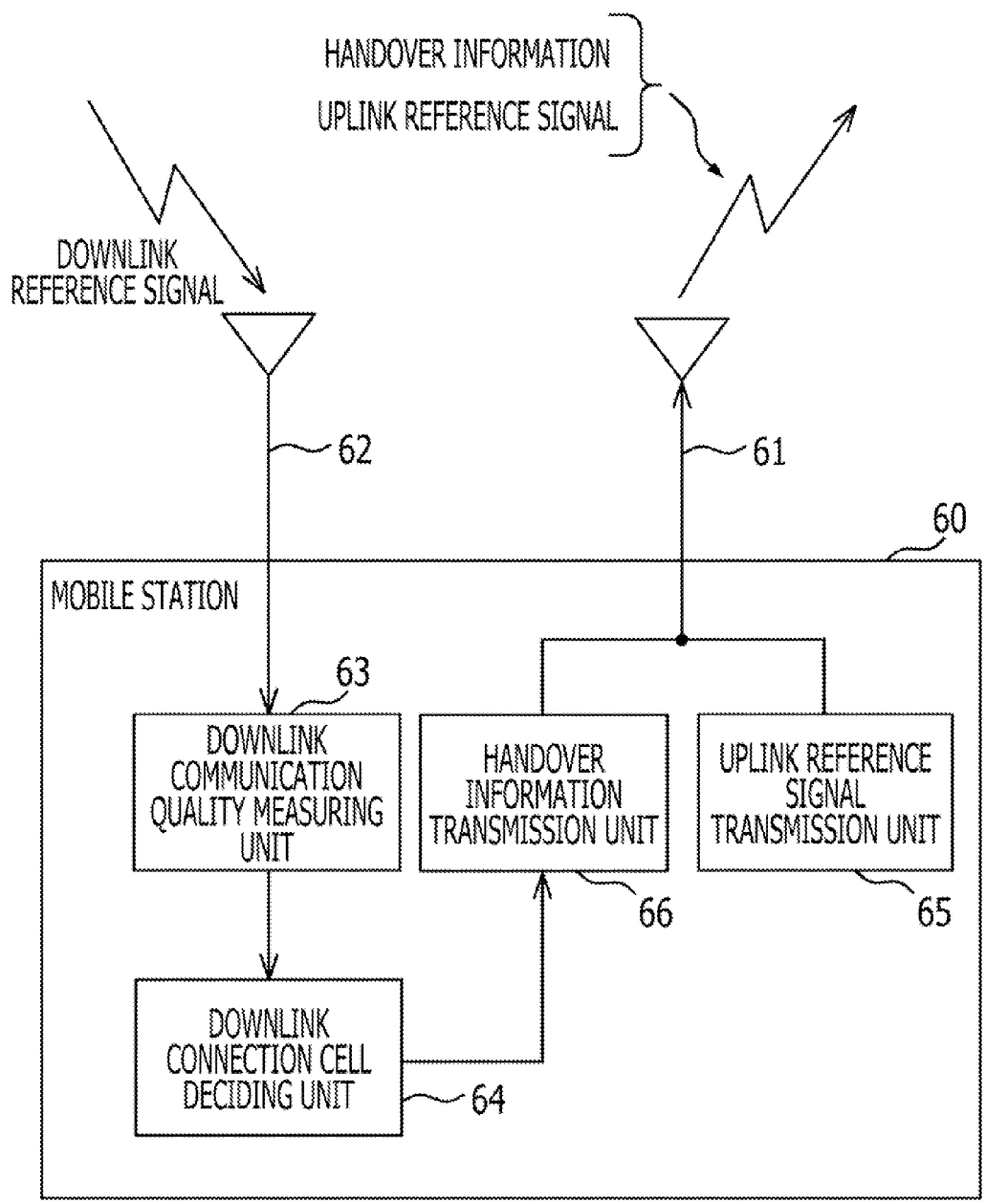
FIG. 24 is a diagram illustrating a configuration example of a mobile station device illustrated in FIG. 23.

FIG. 24 is a diagram illustrating a configuration example of the mobile station 60 illustrated in FIG. 23. Reference numeral 66 indicates a handover information transmission unit. The same components as in FIG. 18 have the same reference numerals that are used in FIG. 18. The mobile station 60 includes the transmission antenna 61, the reception antenna 62, the downlink communication quality measuring unit 63, the downlink communication cell deciding unit 64, the uplink reference signal transmission unit 65, and the handover information transmission unit 66.

The downlink communication cell deciding unit 64 determines whether or not the mobile station 60 performs the handover processing based on the reception quality of the downlink. If the handover occurs, the handover information transmission unit 66 transmits, to the handover base station device 10-1 and the adjacent base station device 10-2, the handover information indicating that the handover occurred. Instead of transmitting the handover information to the handover base station device 10-1 and the adjacent base station device 10-2, the handover information transmission unit 66 may transmit the handover information to either of the base station device of the handover source and the base station device of the handover destination. At this time, the above-described base station device, which received the handover information, may report, that the handover occurred in the mobile station 60 to the other base station device through the inter-base station communication. The handover information may include, for example, the identifier of the mobile station 60 or the identifier of the cell having the cell boundary in which the handover occurred.

Figure 25:
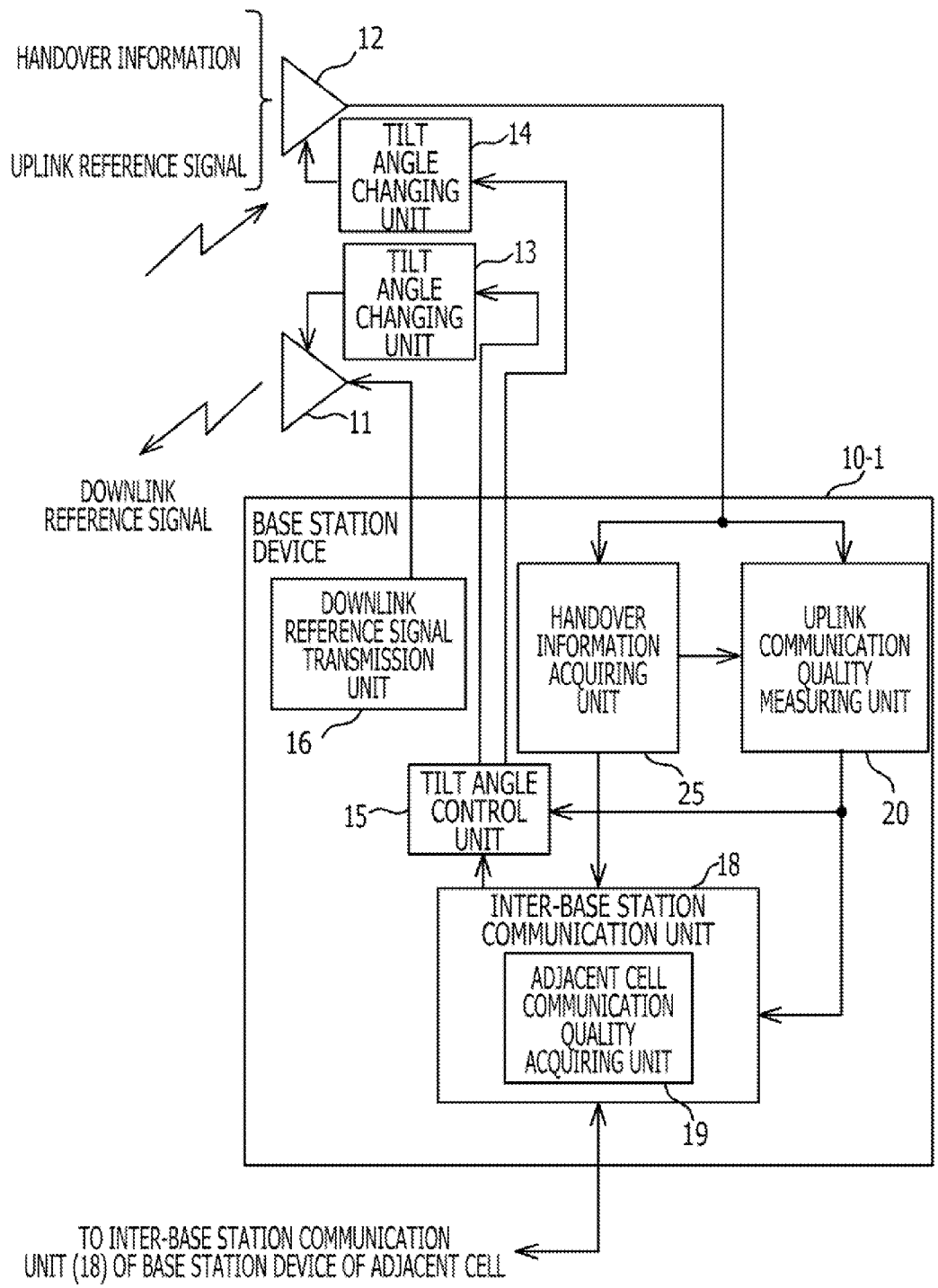
FIG. 25 is a diagram illustrating a configuration example of a base station device illustrated in FIG. 23.

FIG. 25 is a diagram illustrating a configuration example of the base station device 10-1 illustrated in FIG. 23. Reference numeral 25 indicates a handover information acquiring unit. The same components as in FIG. 19 have the same reference numerals that are used in FIG. 19. The base station device 10-1 includes the transmission antenna 11, the reception antenna 12, the tilt angle changing units 13 and 14, the tilt angle control unit 15, the downlink reference signal transmission unit 16, the inter-base station communication unit 18, the uplink communication quality measuring unit 20, and the handover information acquiring unit 25. The inter-base station communication unit 18 includes the adjacent cell communication quality acquiring unit 19.

The handover information acquiring unit 25 receives handover information transmitted from the mobile station 60. If the handover occurs, the uplink communication quality measuring unit 20 measures the communication quality of the uplink between the base station device 10-1 and the mobile station 60. The inter-base station communication unit 18 transmits the uplink communication quality information, which is generated by the uplink communication quality measuring unit 20, to the adjacent base station device 10-2. The adjacent cell communication quality acquiring unit 19 receives the uplink communication quality information that is generated by the uplink communication quality measuring unit 20 of the adjacent base station device 10-2 and is then transmitted from the adjacent base station device 10-2. The uplink communication quality information generated by the uplink communication quality measuring unit 20 and the uplink communication quality information acquired by the adjacent cell communication quality acquiring unit 19 are output to the tilt angle control unit 15.

The tilt angle control unit 15 decides the adjustment amount of the tilt angle of the reception antenna 12 to decrease the difference between the communication quality of the uplink between the communication device 50 and the base station device 10-1 and the communication quality of the uplink between the communication device 50 and the adjacent base station device 10-2. The tilt angle changing unit 14 mechanically or electrically changes the tilt angle of the reception antenna 12 based on the adjustment amount decided by the tilt angle control unit 15. For example, if the communication quality of the uplink between the communication device 50 and the base station device 10-1 is higher than the communication quality of the uplink between the communication device 50 and the adjacent base station device 10-2, the tilt angle control unit 15 decides the adjustment amount to increase the tilt angle of the reception antenna 12. If the communication quality of the uplink between the communication device 50 and the adjacent base station device 10-2 is higher than the communication quality of the uplink between the communication device 50 and the base station device 10-1, the tilt angle control unit 15 decides the adjustment amount to decrease the tilt angle of the reception antenna 12. The configuration of the tilt angle control unit 15 is substantially the same as the configuration described above with reference to FIG. 6.

Moreover, the tilt angle control unit 15 may control the tilt angle of the transmission antenna 11. For example, the communication quality of the uplink between the communication device 50 and the base station device 10-1 is higher than the communication quality of the uplink between the communication device 50 and the adjacent base station device 10-2, the tilt angle control unit 15 determines the adjustment amount of the tilt angle of the transmission antenna 11 to decrease the tilt angle of the transmission antenna 11. If the communication quality of the uplink between the communication device 50 and the adjacent base station device 10-2 is higher than the communication quality of the uplink between the communication device 50 and the base station device 10-1, the tilt angle control unit 15 determines the adjustment amount to increase the tilt angle of the transmission antenna 11. Adjusting the tilt angle of the transmission antenna 11 may prevent to change the boundary of the uplink drastically.

FIG. 26 is an explanation diagram of a control example of a tilt angle of an antenna in the radio communication system illustrated in FIG. 23.

In Operation FA, the downlink reference signal transmission unit 16 of the base station device 10-1 and the other base station devices including the adjacent base station device 10-2 transmit the downlink reference signal. In Operation FB, the downlink communication quality measuring unit 63 of the mobile station 60 measures the reception quality of each of the downlinks between each of the base station devices and the mobile station 60.

In Operation FC, the downlink communication quality measuring unit 63 determines whether or not the handover occurs in the cell boundary between the arrangement cell of the base station device 10-1 and the arrangement cell of the adjacent base station device 10-2. If the handover does not occur (N in Operation FC), the processing ends. If the handover occurs (Y in Operation FC), the process goes to Operation FD. In Operation FD, the mobile station 60 performs the handover processing. At this time, the handover information transmission unit 66 of the mobile station 60 reports the handover information indicating that the handover occurred to the base station device 10-1 and the adjacent base station device 10-2.

In Operation FF, the uplink reference signal transmission unit 65 of the mobile station 60 transmits the uplink reference signal. In Operation FF, the uplink communication quality measuring unit 20 of the base station device 10-1 and the adjacent base station device 10-2 measures the communication quality of each of the uplinks between the base station device 10-1 and the mobile station 60 and between the adjacent base station device 10-2 and the mobile station 60.

In Operation FG, the inter-base communication unit 18 of the base station device 10-1 transmits, to the adjacent base station device 10-2, the uplink communication quality information, generated by the uplink communication quality measuring unit 20. Moreover, the adjacent cell communication quality acquiring unit 19 of the base station device 10-1 receives the uplink communication quality information transmitted from the adjacent base station device 10-2.

In Operation FH, the tilt angle control unit 15 of the base station device 10-1 determines whether the difference of the communication quality of each of the uplinks between the base station device 10-1 and the mobile station 60 and between the adjacent base station device 10-2 and the mobile station 60 is smaller than or equal to a threshold value T4. If the difference of the communication quality is smaller than or equal to the threshold value T4 (Y in Operation FH), the processing ends. If the difference of the communication quality is not smaller than or equal to a threshold value T4 (N in Operation FH), the process goes to Operation FI.

In Operation FI, the tilt angle control unit 15 determines whether or not the communication quality between the base station device 10-1 and the mobile station 60 is higher than the communication quality between the adjacent base station device 10-2 and the mobile station 60. If the communication quality between the base station device 10-1 and the mobile station 60 is higher than the communication quality between the adjacent base station device 10-2 and the mobile station 60 (Y in Operation FI), the process goes to Operation FJ. If the communication quality between the base station device 10-1 and the mobile station 60 is not higher than the communication quality between the adjacent base station device 10-2 and the mobile station 60 (N in Operation FI), the process goes to Operation FK.

In Operation FJ, the adjustment amount deciding unit 32 decides the adjustment amount to decrease the tilt angle of the transmission antenna 11. Furthermore or instead, the adjustment amount deciding unit 32 decides the adjustment amount to increase the tilt angle of the reception antenna 12. In Operation FK, the adjustment amount deciding unit 32 decides the adjustment amount to increase the tilt angle of the transmission antenna 11. Furthermore or instead, the adjustment amount deciding unit 32 decides the adjustment amount to decrease the tilt angle of the reception antenna 12. The tilt angle changing unit 13 changes the tilt angle of the transmission antenna 11 based on the decided adjustment amount. Furthermore or instead, the tilt angle changing unit 14 changes the tilt angle of the reception antenna 12 based on the decided adjustment amount. After Operation FJ or Operation FK, the processing ends.

According to the present embodiment, the mobile station 60 in which the handover occurs is in the cell boundary of the downlink, which makes it possible to control each tilt angle of the transmission antenna 11 and the reception antenna 12 based on the uplink communication quality of each of the uplinks between each of the base station devices and the mobile station 60 that are adjacent each other.

As with the embodiments described with reference to FIG. 13 to FIG. 16, in the embodiments described with reference to FIG. 23 to FIG. 26, each of the base station devices may transmit, from each of the reception antennas 12 thereof, the uplink reference signal for the communication quality measurement of the uplink. By receiving the uplink reference signal from each of the base station devices, the mobile station 60 may measure the communication quality of each of the uplinks between each of the base station devices and the mobile station 60. Therefore, the base station device 10-1 and the adjacent base station device 10-2 may include the components illustrated in FIG. 14, and the mobile station 60 may include the components illustrated in FIG. 15.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A base station device, comprising:
   a first antenna which transmits a radio signal in a downlink;
   a second antenna which receives a radio signal in an uplink; and
   a tilt angle control unit which controls a tilt angle of the first antenna and the second antenna to decrease a difference in a position of a cell boundary of the downlink and a position of the cell boundary of the uplink based on a first downlink communication quality and a first uplink communication quality with respect to a first base station device and on a second downlink communication quality and a second uplink communication quality with respect to an adjacent second base station device, wherein the tilt angle control unit groups mobile stations receiving communications from the first base station device and the adjacent second base station device into a first group, in which a highest communication quality of the downlink is measured based on reception power, and a second group, in which the highest communication quality of the uplink is measured based on reception power, compares a number of mobile stations in the first group and a number of mobile station in the second group, and controls the tilt angle of the first antenna or the second antenna to decrease a mismatch between the number of mobile stations in the first group and the number of mobile stations in the second group, wherein the tilt angle control unit further determines whether a cell boundary of the downlink or a cell boundary of the uplink is closer to the first base station device based on the comparison of the number of mobile stations between the first group and the number of mobile stations in the second group.

2. The base station device according to claim 1, wherein the tilt angle control unit controls the tilt angle of the first antenna to decrease the difference between: a) the first downlink communication quality between a communication device positioned in a prescribed position and the first base station device and b) the second downlink communication quality between the communication device and the second base station device.

3. The base station device according to claim 1, wherein the tilt angle control unit controls the tilt angle of the second antenna to decrease the difference between: a) the first uplink communication quality between the communication device positioned in the prescribed position and the first base station device and b) the second uplink communication quality between the communication device and the second base station device.

4. The base station device according to claim 1, wherein the tilt angle control unit controls the tilt angle of the first antenna or the second antenna to decrease the difference between: a) the first uplink communication quality between a mobile station which performs handover processing and the first base station device and b) the second uplink communication quality between the mobile station and the adjacent second base station device.

5. The base station device according to any of claims 1 to 4, wherein the tilt angle control unit controls a tilt angle of the first antenna and the second antenna to decrease the difference between a) the cell boundary of the downlink and the cell boundary of the uplink between the first base station device and b) the adjacent second base station device.

6. A communication system, comprising:
a base station including,
a first antenna which transmits a radio signal in a downlink;
a second antenna which receives a radio signal in an uplink; and
a tilt angle control unit which controls a tilt angle of the first antenna and the second antenna to decrease a difference of a cell boundary between the downlink and the uplink based on a first downlink communication quality and a first uplink communication quality with respect to a first base station device and on a second downlink communication quality and a second uplink communication quality with respect to an adjacent second base station device; and a mobile station which communicates with the base station including, a reference signal transmission unit which transmits a reference signal of a communication quality measurement in the uplink, wherein the tilt angle control unit groups mobile stations receiving communications from the first base station device and the adjacent second base station device into a first group, in which a highest communication quality of the downlink is measured based on reception power, and a second group, in which the highest communication quality of the uplink is measured based on reception power, compares a number of mobile stations in the first group and a number of mobile station in the second group, and controls the tilt angle of the first antenna or the second antenna to decrease a mismatch between the number of mobile stations in the first group and the number of mobile stations in the second group, wherein the tilt angle control unit further determines whether a cell boundary of the downlink or a cell boundary of the uplink is closer to the first base station device based on the comparison of the number of mobile stations between the first group and the number of mobile stations in the second group.

7. The communication system according to claim 6, wherein the reference signal transmission unit transmits the reference signal when the mobile station performs the handover processing.

8. A control method for controlling a tilt angle of a first antenna and a second antenna, provided in a first base station device, used for transmitting a radio signal in a downlink and for receiving a radio signal in an uplink, the control method comprising:

measuring a first downlink communication quality and a first uplink quality with respect to the first base station device and a second downlink communication quality and a second uplink communication quality with respect to an adjacent second base station device;

grouping mobile stations receiving communications from the first base station device and the adjacent second base station device into a first group, in which a highest communication quality of the downlink is measured based on reception power, and a second group, in which the highest communication quality of the uplink is measured based on reception power;

comparing a number of mobile stations in the first group and a number of mobile station in the second group;

controlling the tilt angle of the first antenna or the second antenna to decrease a mismatch between the number of mobile stations in the first group and the number of mobile stations in the second group; and determining whether a cell boundary of the downlink or a cell boundary of the uplink is closer to the first base station device based on the comparison of the number of mobile stations between the first group and the number of mobile stations in the second group.

9. The control method according to claim 8, further comprising controlling the tilt angle of the first antenna to decrease the difference between: a) the first downlink communication quality between a communication device positioned in a prescribed position and the first base station device and b) the second downlink communication quality between the communication device and the second base station device.

10. The control method according to claim 8, further comprising
controlling the tilt angle of the second antenna to decrease the difference between: a) the first uplink communication quality between the communication device positioned in the prescribed position and the first base station device and b) the second uplink communication quality between the communication device and the second base station device.

11. The control method according to claim 9, further comprising
controlling a tilt angle of the first antenna and the second antenna to decrease the difference between a) the cell boundary of the downlink and the cell boundary of the uplink between the first base station device and b) the adjacent second base station device.

12. The control method according to claim 8, further comprising
controlling the tilt angle of the first antenna or the second antenna to decrease the difference between: a) the first uplink communication quality between a mobile station which performs handover processing and the first base station device and b) the second uplink communication quality between the mobile station and the adjacent second base station device.

13. The control method according to claim 12, further comprising
controlling a tilt angle of the first antenna and the second antenna to decrease the difference between a) the cell boundary of the downlink and the cell boundary of the uplink between the first base station device and b) the adjacent second base station device.

14. The control method according to claim 8, wherein the controlling reduces a difference in a position of a cell boundary of the downlink and the uplink between the first base station device and the adjacent second base station device.

* * * * *